United States Patent
Tanaka et al.

(10) Patent No.: US 8,103,771 B2
(45) Date of Patent: Jan. 24, 2012

(54) DISTRIBUTING PROCESSING APPARATUS, METHOD, AND SYSTEM

(75) Inventors: Shinichi Tanaka, Kanagawa (JP); Yukiyoshi Hirose, Kanagawa (JP)

(73) Assignee: Sony Corporation, Tokyo (JP)

( * ) Notice: Subject to any disclaimer, the term of this patent is extended or adjusted under 35 U.S.C. 154(b) by 552 days.

(21) Appl. No.: 10/549,427

(22) PCT Filed: Feb. 2, 2005

(86) PCT No.: PCT/JP2005/001866
§ 371 (c)(1),
(2), (4) Date: Oct. 13, 2005

(87) PCT Pub. No.: WO2005/076131
PCT Pub. Date: Aug. 18, 2005

(65) Prior Publication Data
US 2006/0294218 A1    Dec. 28, 2006

(30) Foreign Application Priority Data
Feb. 3, 2004  (JP) .................................. 2004-026454

(51) Int. Cl.
G06F 15/173  (2006.01)
G06F 15/16  (2006.01)

(52) U.S. Cl. ........................................ 709/226; 709/208

(58) Field of Classification Search .................. 709/220, 709/203, 226, 208; 718/102–108; 710/15–19; 455/453
See application file for complete search history.

(56) References Cited

U.S. PATENT DOCUMENTS

| | | | | |
|---|---|---|---|---|
| 5,031,089 A | * | 7/1991 | Liu et al. | 709/226 |
| 5,978,560 A | * | 11/1999 | Tan et al. | 358/1.15 |
| 5,993,038 A | * | 11/1999 | Sitbon et al. | 709/202 |
| 6,081,826 A | * | 6/2000 | Masuoka et al. | 718/100 |
| 6,088,516 A | * | 7/2000 | Kreisel et al. | 709/221 |
| 6,128,644 A | * | 10/2000 | Nozaki | 709/203 |
| 6,128,657 A | * | 10/2000 | Okanoya et al. | 709/224 |
| 6,314,447 B1 | * | 11/2001 | Lea et al. | 718/105 |
| 6,327,622 B1 | * | 12/2001 | Jindal et al. | 709/228 |
| 6,535,977 B1 | * | 3/2003 | Holle et al. | 713/2 |
| 6,728,905 B1 | * | 4/2004 | Gnanasivam et al. | 714/43 |
| 7,233,998 B2 | * | 6/2007 | Suzuoki et al. | 709/230 |
| 2002/0032777 A1 | * | 3/2002 | Kawata et al. | 709/226 |
| 2003/0163734 A1 | * | 8/2003 | Yoshimura et al. | 713/201 |
| 2006/0047818 A1 | * | 3/2006 | Kruglick et al. | 709/227 |
| 2006/0143328 A1 | * | 6/2006 | Fleischer et al. | 710/19 |

FOREIGN PATENT DOCUMENTS

| | | |
|---|---|---|
| JP | 5-342123 | 12/1993 |
| JP | 6-250984 | 9/1994 |
| JP | 6-266643 | 9/1994 |
| JP | 9-212467 | 8/1997 |

(Continued)

*Primary Examiner* — Faruk Hamza
*Assistant Examiner* — Jeffrey Nickerson
(74) *Attorney, Agent, or Firm* — K&L Gates LLP

(57) ABSTRACT

An information processing apparatus for performing, in response to a user's operation, reliable and effective distributed processing among a plurality of information processing apparatuses interconnected through a network. A main processor writes information data about an operating status of its own apparatus as an apparatus data in a main memory connected to the information processing controller, and transmits the apparatus data to another apparatus in response to a request from the other apparatus. Accordingly, an information processing apparatus checks the operating status of its own and other information processing apparatuses, selects an information processing apparatus for executing a computer program in response to the user's operation, and causes the selected apparatus to execute the computer program.

15 Claims, 15 Drawing Sheets

FOREIGN PATENT DOCUMENTS

| | | |
|---|---|---|
| JP | 2000-112908 | 4/2000 |
| JP | 2002-342165 | 11/2002 |
| JP | 2002-351850 | 12/2002 |
| JP | 2002-358289 | 12/2002 |
| JP | 2002-366533 | 12/2002 |
| JP | 2002-366534 | 12/2002 |
| JP | 2004-13866 | 1/2004 |

* cited by examiner

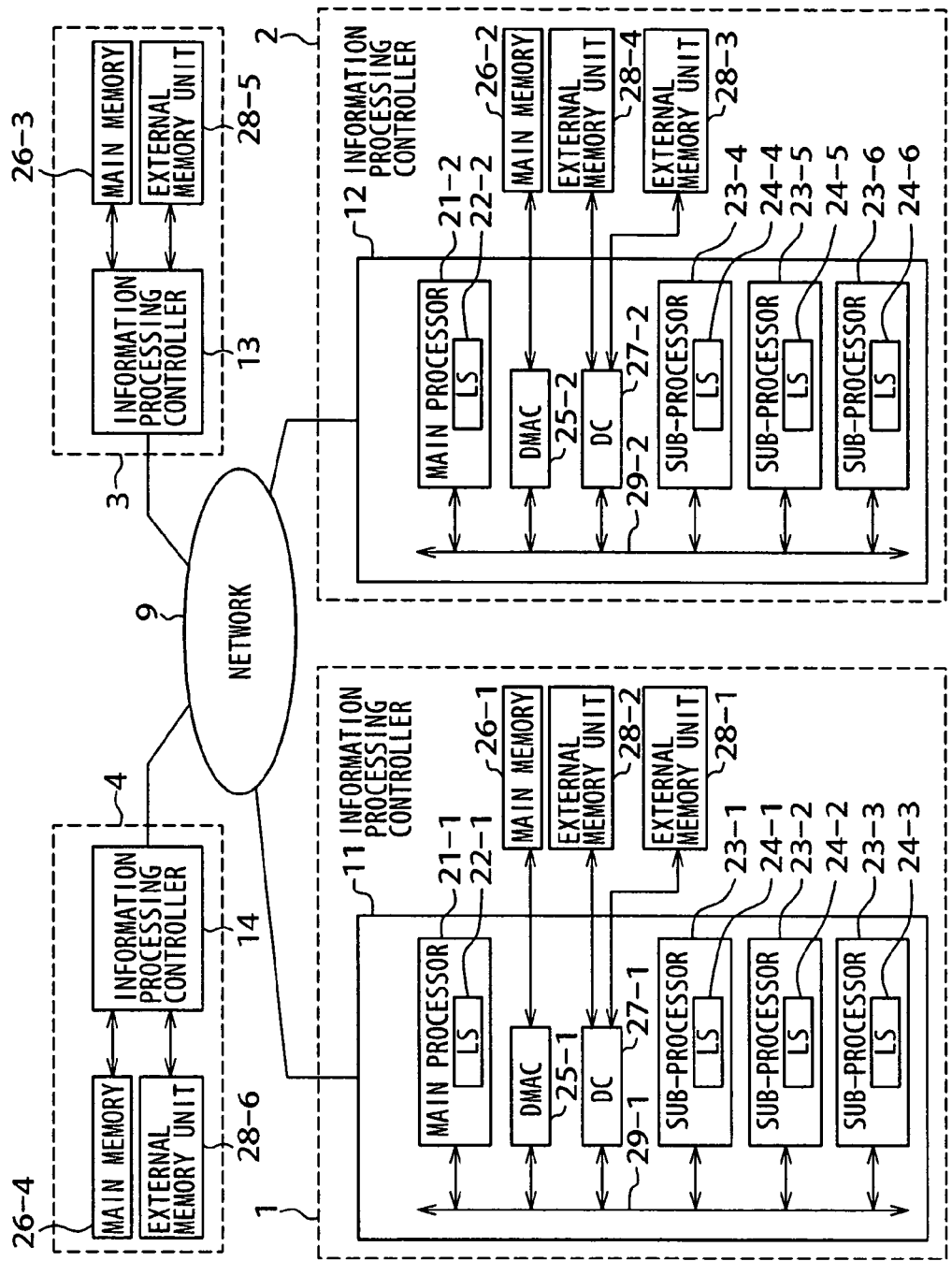

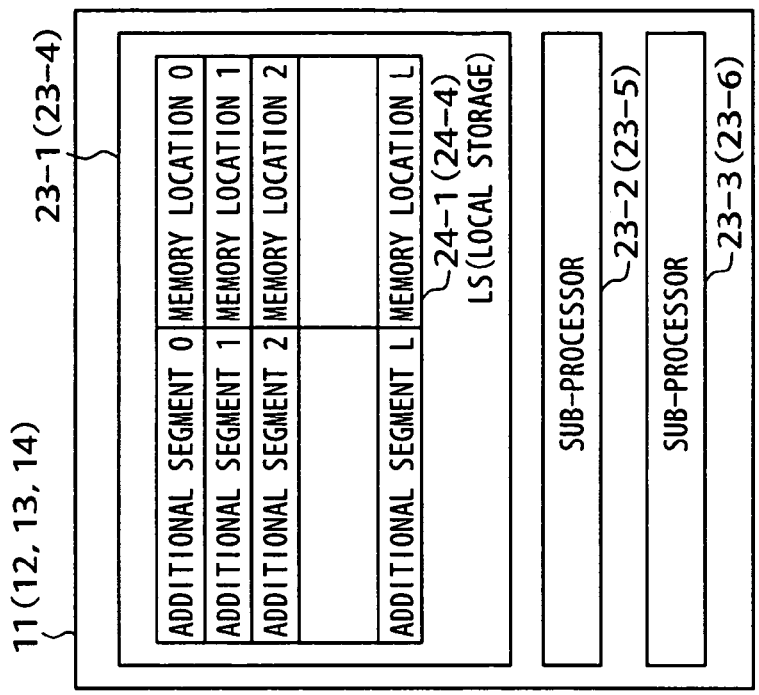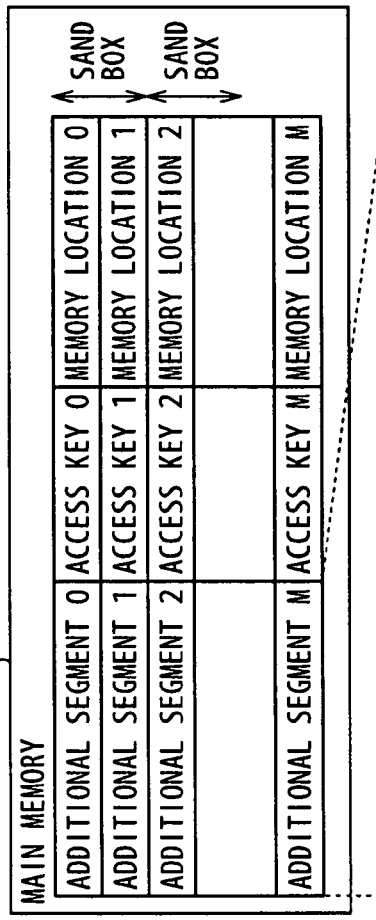

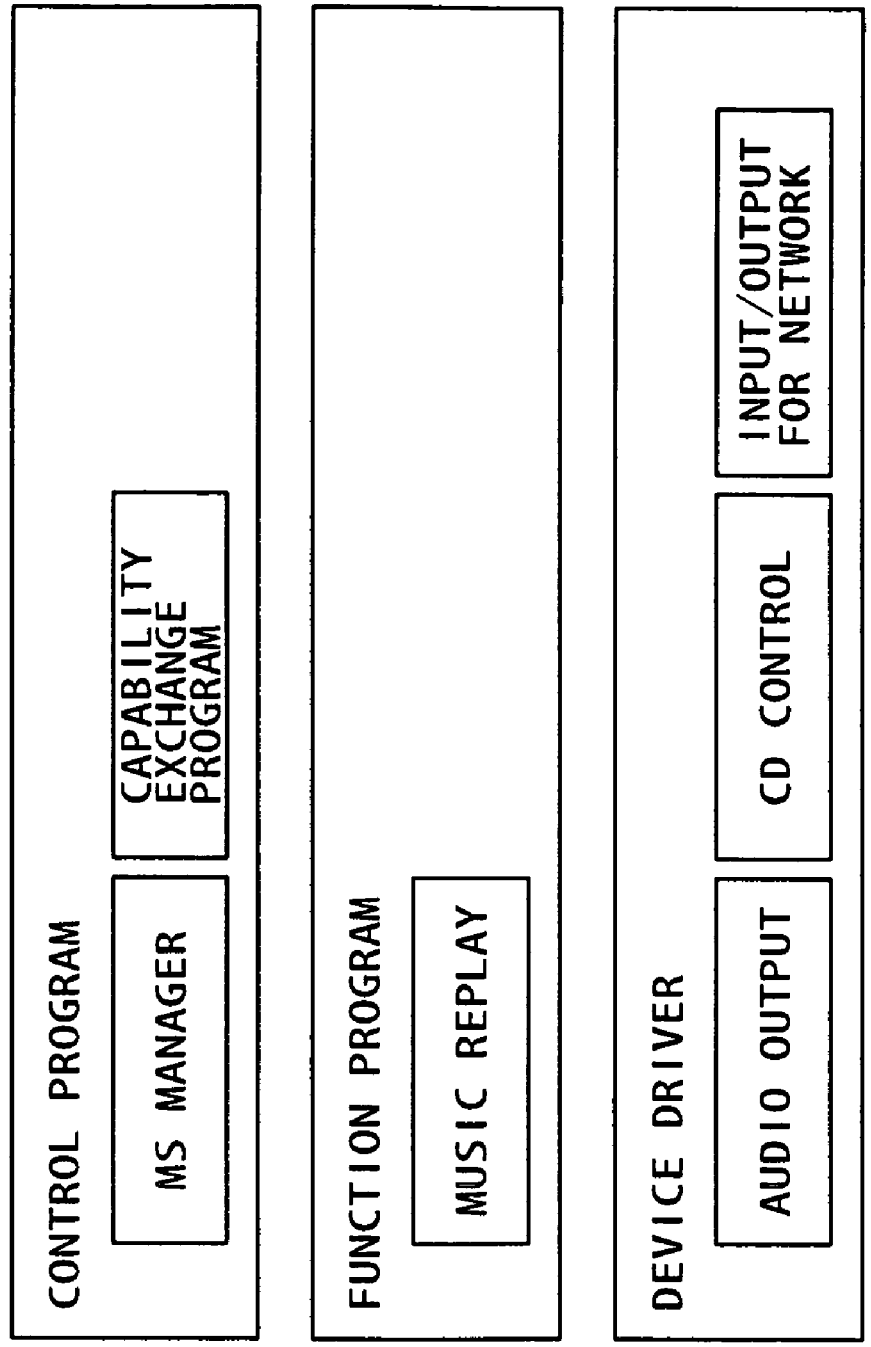

DISTRIBUTING PROCESSING APPARATUS, METHOD, AND SYSTEM

CROSS REFERENCE TO RELATED APPLICATION

The present application claims priority to Japanese Patent Document No. P2004-026454 filed on Feb. 3, 2004, the disclosure of which is herein incorporated by reference.

BACKGROUND

The present invention relates to an information processing apparatus, an information processing method, an information processing system, and a computer program for information processing.

Recently, grid computing attracts attention. The grid computing is a technique that enables a plurality of information processing apparatuses connected to a network to operate in conjunction with each others so as to realize higher computational performance.

For example, in Japanese Patent Application Publication 2002-342165, Japanese Patent Application Publication 2002-351850, Japanese Patent Application Publication 2002-358289, Japanese Patent Application Publication 2002-366533 and Japanese Patent Application Publication JP 2002-366534, it is disclosed that a computer architecture for high-speed processing is realized by using a uniform modular structure, a common computing module, and a uniform software cell. However, in a network system to which a plurality of information processing apparatuses are interconnected through a network, it is necessary for each of the information processing apparatuses or an information processing apparatus which manages the network system to know operation statuses of other information processing apparatuses, in order to perform a distributed processing within the entire network system, in response to a user's operation on the network system.

SUMMARY

Accordingly, the present invention is configured to allow such distributed processing to be performed reliably and effectively among the plurality of information processing apparatuses interconnected through the network.

An information processing apparatus according to the present invention is connected with another information processing apparatus through a network, and performs certain information processing in response to a predetermined command, and characterized by including: capability exchange means for collecting information regarding an operating status from the another information processing apparatus and creating an apparatus information table; and apparatus specifying means for comparing information regarding a resource required to execute a command if the command is issued, with information regarding the operating status of the apparatus information table, and for specifying the information processing apparatus capable of executing the command.

If the information processing apparatus of the present invention, having the above-mentioned structure, is connected with another information processing apparatus through the network, the information regarding operating status is collected from the another information processing apparatus, and the apparatus information table is created. Further, if a predetermined command is issued, the information regarding a resource required to execute the command is compared with the information regarding the operating status of the apparatus information table, and an information processing apparatus capable of executing the command is specified, thereby the distributed processing may be performed reliably and effectively among a plurality of information processing apparatuses.

As described above, according to the present invention, a distributed processing may be performed reliably and effectively among a plurality of information processing apparatuses interconnected through a network.

Additional features and advantages of the present invention are described in, and will be apparent from, the following Detailed Description and the figures.

BRIEF DESCRIPTION OF THE FIGURES

FIG. 1 is a diagram showing an example of a network system in accordance with the present invention.

FIG. 2A-FIG. 2C are diagrams for explaining an information processing controller provided for an information processing apparatus in accordance with the present invention.

FIG. 15 is a diagram showing an example of a software structure of the portable CD player in FIG. 9.

DETAILED DESCRIPTION

Figure 3:
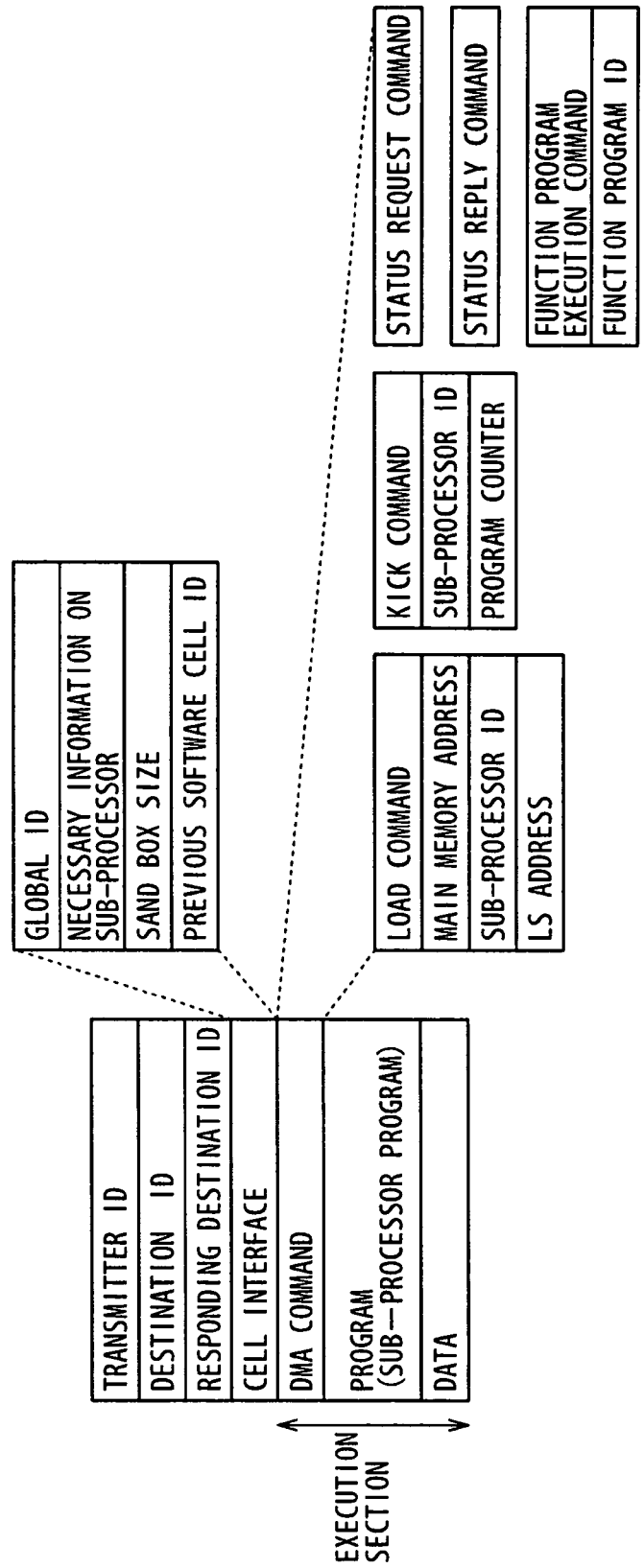
FIG. 3 is a chart showing an example of a software cell.

The present invention relates to an information processing apparatus, an information processing method, an information processing system, and a computer program for information processing embodiments of which will be described below.

[Basic Structure of Network System and Information Processing Apparatus: FIGS. 1-4]

FIG. 1 shows an example of a network system according to the present invention, in which a plurality of information processing apparatuses 1, 2, 3, and 4 are interconnected through a network 9.

(Information Processing Apparatus and Information Processing Controller)

The information processing apparatuses 1, 2, 3, and 4 are various types of AV (Audio and Visual) devices and portable devices as will respectively be described later.

As for an information processing apparatus 1, the information processing apparatus 1 is provided with an information processing controller 11 that serves as a computer function unit. The information processing controller 11 has a main processor 21-1, sub-processors 23-1, 23-2, 23-3, a DMAC (Direct Memory Access Controller) 25-1, and a DC (Disc Controller) 27-1.

The main processor 21-1 performs schedule management of sub-processor program execution (data processing) by the sub-processors 23-1, 23-2, and 23-3, and general management of the information processing controller 11 (information processing apparatus 1). Alternatively, the main processor 21-1 may also be arranged such that a program other than the program for management within the main processor 21-1 may be operated. In this case, the main processor 21-1 functions also as a sub-processor. The main processor 21-1 has an LS (Local Storage) 22-1.

Although one sub-processor is sufficient, the number of sub-processors is desirably plural. In this example, a plurality of sub-processors are employed.

Under control of the main processor 21-1, the sub-processors 23-1, 23-2, and 23-3 respectively execute sub-processor programs in parallel and independently, and process data. Further, in some cases, the program in the main processor 21-1 may be arranged to operate together with the sub-processor program in the sub-processors 23-1, 23-2, and 23-3. A function program to be described later is also a program which operates within the main processor 21-1. The sub-processors 23-1, 23-2, and 23-3 have LS's (local storage) 24-1, 24-2, and 24-3, respectively.

The DMAC 25-1 accesses a program and data which are stored in a main memory 26-1 having a DRAM (dynamic RAM) connected to the information processing controller 11 etc., and the DC 27-1 accesses external memory units 28-1 and 28-2 connected to the information processing controller 11.

The external memory units 28-1 and 28-2 may be a fixed disk (hard disk) or a removable disc. Further, various types of memory units may be used optical disks, such as an MO, a CD±RW, and a DVD±RW, a memory disk, and an SRAM (static RAM), a ROM, etc. Therefore, although the DC 27-1 is referred to as a disc controller, it is an external memory unit controller.

Like an example of FIG. 1, the information processing controller 11 may be arranged such that a plurality of external memory units 28 may be connected to the information processing controller 11.

The main processor 21-1, the sub-processors 23-1, 23-2, 23-3, the DMAC 25-1, and the DC 27-1 are interconnected through a bus 29-1.

An identifier capable of uniquely identifying the information processing apparatus 1 having the information processing controller 11 within the entire network is assigned to the information processing controller 11 as an information processing apparatus ID.

Similarly, the main processor 21-1 and the sub-processors 23-1, 23-2, and 23-3 are respectively assigned with identifiers, which can respectively specify them, as a main processor ID and sub-processor ID's.

The information processing controller 11 is desirably constructed as a one-chip IC (Integrated Circuit).

Other information processing apparatuses 2, 3, and 4 are constructed similarly. Here, even if units with the same parent numeral have different branch numerals, they carry out the same work as long as there is no explanation in particular. Further, the branch numeral may be omitted in the following description assuming that a different branch numeral does not cause any difference.

(Access to Main Memory from Each Sub-Processor)

As described above, each of the sub-processors 23 in one information processing controller executes a sub-processor program independently and performs processing of data. If different sub-processors perform reading or writing simultaneously with respect to the same area in the main memory 26, there is a possibility that it may cause a mismatch of data. Accordingly, access to the main memory 26 from the sub-processor 23 is carried out according to the following procedure.

As shown in FIG. 2A, the main memory 26 includes memory locations which can specify a plurality of addresses. Each memory location is provided with an additional segment for storing information which shows status of data. The additional segment includes an F/E bit, a sub-processor ID, and an LS address (Local Storage Address). Further, each memory location is provided with an access key (to be described later). The F/E bit is defined as follows.

F/E bit=0 indicates data during processing which is being read by the sub-processor 23 or an invalid data which is not the latest data because it is empty, i.e. it indicates that the data cannot be read out. Further, F/E bit=0 shows that the data may be written in the memory location, and it is set as "1" after writing.

F/E bit=1 indicates that the data in the memory location is not read by the sub-processors 23, and it is the latest and unprocessed data. The data in the memory location may be read, and it is set as "0" by the sub-processors 23, after being read. Further, F/E bit=1 shows that data cannot be written in the memory location.

Furthermore, in a status where F/E bit=0 (read disable/write enable) as described above, it is possible to set up a read-out schedule with respect to the memory location. In order to schedule the read-out operation with respect to the memory location of F/E bit=0, the sub-processor 23 writes the sub-processor ID and the LS address of the sub-processor 23 as read-out schedule information in the additional segment of the memory location.

Further, if the data is written in the memory location with which the read-out schedule is made by the sub-processor 23 on the data write side, and if it is set as F/E bit=1 (read enable/write disable), the sub-processor ID and the LS address, which are the read-out schedule data and written beforehand in the additional segment, are read out.

If the data needs to be processed by a plurality of sub-processors in multiple steps by controlling read/write operations of the data of each memory location in such a way as mentioned above, immediately after the sub-processor 23 which performs processing in an initial step writes the processed data in the predetermined address of the main memory 26, another sub-processor 23 which performs processing at a following step can read the initially-processed data.

As shown in FIG. 2B, an LS 24 in each of the sub-processors 23 also includes a memory location which can specify a plurality of addresses. Each memory location is similarly provided with an additional segment. The additional segment includes a busy bit.

If the sub-processor 23 reads the data in the main memory 26 into a memory location of its own LS 24, a corresponding busy bit is set as "1" to reserve the memory location. Other data cannot be stored in the memory location whose busy bit is "1". After reading out the data from the memory location of the LS 24, the busy bit is set to "0" and may be used now for an arbitrary purpose.

As shown in FIG. 2A, a plurality of sand boxes are further included in the main memory 26 connected with each information processing controller. The sand box defines an area in the main memory 26. Each sand box is assigned to each of the sub-processors 23, and the corresponding sub-processor can use it exclusively. In other words, each of the sub-processors 23 can use the sand box assigned to itself, but each sub-processor 23 cannot access data beyond the area.

The main memory 26 includes a plurality of memory locations, and the sand box is a set of these memory locations.

Furthermore, in order to realize exclusive control of the main memory 26, a key management table as shown in FIG. 2C is used. The key management table is stored in a relatively high speed memory such as an SRAM in the information processing controller, and is defined to be associated with the DMAC 25.

Processing when the sub-processor 23 uses the main memory 26 is as follows. First, the sub-processor 23 outputs a read or write command to the DMAC 25. This command includes its own sub-processor ID and an address of the main memory 26 to which the sub-processor requests an access.

Before executing this command, the DMAC 25 checks the sub-processor key of a sub-processor of the access requesting party with reference to a key management table. Next, the DMAC 25 executes the above-mentioned command, only if the checked sub-processor key of the access requesting party is compared with an access key assigned to the memory location as shown in FIG. 2A in the main memory 26 of the access requested party, and these two keys are in agreement with each other.

As for the key mask in the key management table as shown in FIG. 2C, if its arbitrary bit is set to "1", a corresponding bit of the sub-processor key which is associated with the key mask may be set to "0" or "1".

For example, suppose that a sub-processor key is 1010. Typically, this sub-processor key allows only an access to the sand box whose access key is 1010. If the key mask associated with this sub-processor key is set as "0001", matching judgment between the sub-processor key and the access key is masked only at a corresponding digit, whose bit is set to 1, in the key mask. The sub-processor key 1010 allows access to the sand box having an access key of either 1010 or 1011.

In this way, exclusivity of the sand box in the main memory 26 is realized. In other words, if the data needs to be processed in multiple steps by the plurality of sub-processors in one information processing controller, the construction as described above allows only the sub-processor which performs processing at the initial step and the sub-processor which performs processing at the following step to access the predetermined address in the main memory 26, thus protecting the data.

For example, the following usage may be employed. First, all the values of the key mask are zeroed immediately after the information processing apparatus is turned on. Suppose that a program in the main processor is executed and operates in conjunction with a sub-processor program in the sub-processor. If the resulting processed data outputted by the first sub-processor is once stored in the main memory and the data is desired to be inputted into the second sub-processor, it may be necessary that the corresponding main memory area is accessed by either of the sub-processors. In such a case, the program in the main processor suitably changes the value of the key mask and prepares the main memory area which may be accessed by the plurality of sub-processors, to thereby allowing the sub-processors to perform a multiple step process.

More specifically, if the multi step processing is performed in such a way that data from another information processing apparatus processing by the first sub-processor→a first main memory area→processing by the second sub-processor→a second main memory area, the second sub-processor cannot access the first main memory area if the following setup is used:

the sub-processor key of the first sub-processor: 0100
the access key of the first main memory area: 0100
the sub-processor key of the second sub-processor: 0101, and
the access key of the second main memory area: 0101.

Accordingly, setting the key mask of the second sub-processor to 0001 allows the second sub-processor to access the first main memory area.

(Generation and Structure of Software Cell)

In the network system of FIG. 1, a software cell is transmitted among the information processing apparatuses 1, 2, 3 and 4 for distributed processing among the information processing apparatuses 1, 2, 3 and 4. In other words, the main processor 21 included in the information processing controller in a certain information processing apparatus generates the software cell containing a command, a program, and data, and transmits it to another information processing apparatus through the network 9, to thereby realizing distributed processing.

An example of a structure of the software cell is shown in FIG. 3. The software cell of this example includes a transmitter ID, a destination ID, a responding destination ID, a cell interface, a DMA command, a program, and data.

The transmitter ID includes a network address of the information processing apparatus which is the transmitter of the software cell, a information processing apparatus ID of the information processing controller in the apparatus, and also identifiers (the main processor ID and the sub-processor ID) of the main processor 21 and each of the sub-processors 23 which are provided for the information processing controller in the information processing apparatus.

The destination ID and the responding destination ID respectively include the same information regarding the information processing apparatus which is the destination of the software cell, and the information processing apparatus to which an execution result of the software cell is forwarded.

The cell interface is information required for use of the software cell, and includes a global ID, information of a required sub-processor, a sand box size, and a previous software cell ID.

The global ID may uniquely identify the software cell, with respect to the entire network, and is created based on the transmitter ID and the time (date and time) of creation or transmission of the software cell.

The required information on the sub-processor is set as the number of the sub-processors required to execute the software cell. The sand box size is set as amounts of memories in the main memory 26 and in the LS 24 of the sub-processors 23 required to execute the software cell.

The previous software cell ID is an identifier of the previous software cell in one group of software cells which require sequential execution such as streaming data etc.

An execution section of the software cell includes a DMA command, a program, and data. A series of DMA commands necessary to activate the program are included in the DMA command, and a sub-processor program to be executed by the sub-processor 23 is included in the program. The data here is data processed by a program including this sub-processor program.

Furthermore, a load command, a kick command, a function program execution command, a status request command, and a status return command are included in the DMA command.

The load command is a command for loading information stored in the main memory 26 to the LS 24 in the sub-processors 23, and includes the main memory address, the sub-processor ID, and the LS address in addition to the load command itself. The main memory address indicates an address of a predetermined area in the main memory 26 from which the information is loaded. The sub-processor ID and the LS address indicate an identifier of the sub-processor 23 and an address of the LS 24 into which the information is loaded.

The kick command is a command for starting execution of the sub-processor program, and includes the sub-processor ID and a program counter in addition to the kick command itself. The sub-processor ID identifies the sub-processor 23 to be kicked, and the program counter provides an address for the program counter for executing the sub-processor program.

The function program execution command is a command with which a certain information processing apparatus requests another information processing apparatus to execute the function program as will be described later. The information processing controller in the information processing apparatus having received the function program execution command identifies the function program to be activated by the function program ID as described later.

Figure 6:
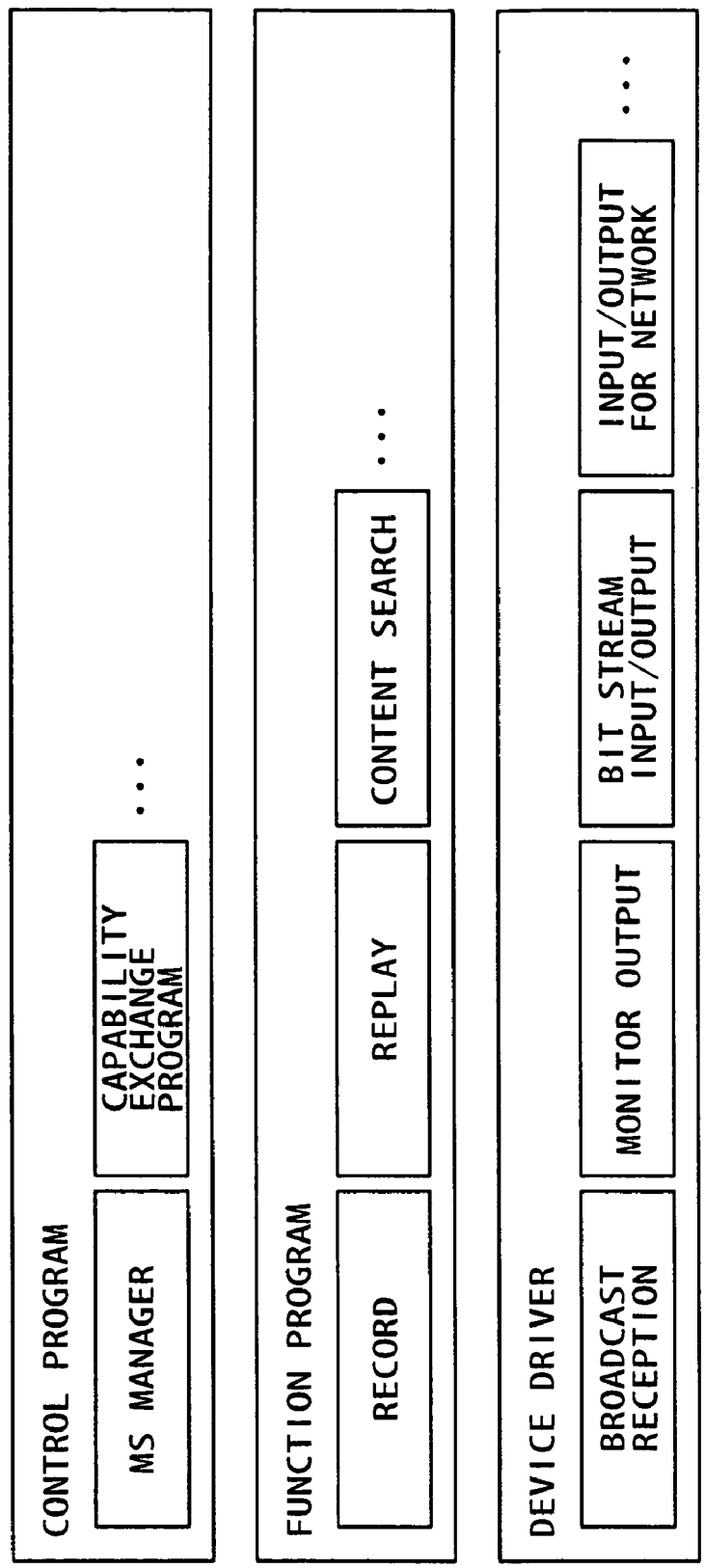
FIG. 6 is a diagram showing an example of a software structure of a information processing controller.

The status request command is a command for requiring to transmit an apparatus data regarding a current operating status (state) of the information processing apparatus as indicated by the destination ID, to the information processing apparatus as indicated by the responding destination ID. Although the function program will be described later, it is a sub-processor program categorized as a function program in a diagram of the software stored by the main memory 26 of the information processing controller as shown in FIG. 6. The function program is loaded into the main memory 26, and is executed by the main processor 21.

The status return command is a command with which the information processing apparatus having received the above-mentioned status request command sends its own apparatus data to the information processing apparatus as indicated by the responding destination ID contained in the status request command. The status return command stores the apparatus data in data area of the execution section.

Figure 4:
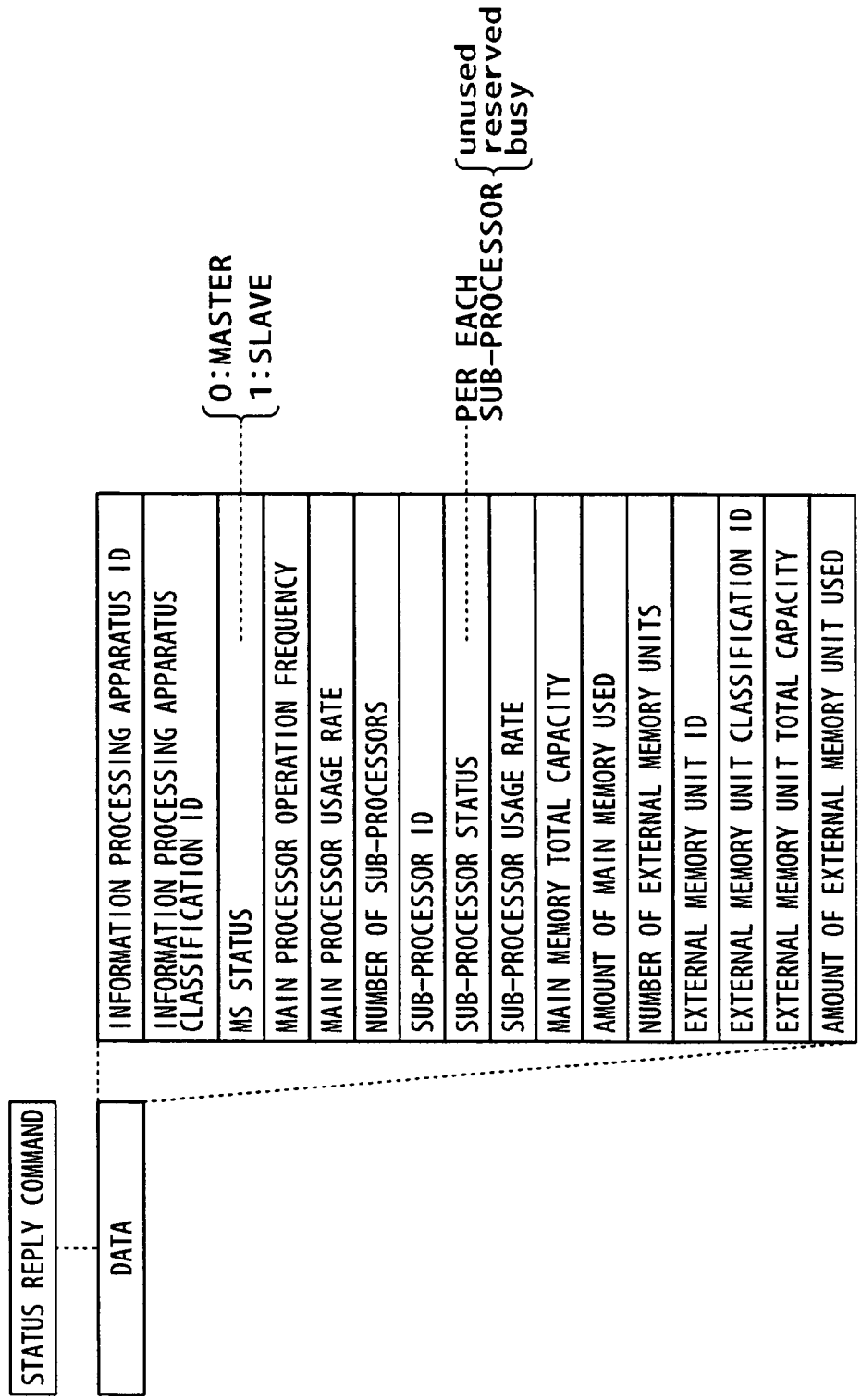
FIG. 4 is a chart showing data area of a software cell in a case where a DMA command is a status return command.

FIG. 4 shows a structure of the data area of the software cell in case the DMA command is the status return command.

The information processing apparatus ID is an identifier for identifying information processing apparatus provided with the information processing controller, and shows an ID of an information processing apparatus which transmits a status return command. When a power is turned on, the information processing apparatus ID is generated by the main processor 21 included in the information processing controller in the information processing apparatus, based on date and time of turning the power on, the number of the sub-processors 23 included in the information processing controller in the information processing apparatus, the network address of the information processing apparatus, etc.

The information processing apparatus classification ID includes a value indicating a feature of the information processing apparatus. The feature of the information processing apparatus means, for example, a hard disk recorder, a PDA (Personal Digital Assistants), a portable CD (Compact Disc) player, etc., as will be set forth later. Further, the information processing apparatus classification ID may indicate functions of the information processing apparatus, such as image/audio recording and image/audio replay. The value indicating the feature and the function of the information processing apparatus is predetermined, and it is possible to know the feature and the function of the information processing apparatus by reading the information processing apparatus classification ID.

An MS (master/slave) status shows that the information processing apparatus is operating as either a master apparatus or a slave apparatus, as will be set forth later. If the status is set as "0", it shows that it is operating as the master apparatus. Being set as "1", it shows that it is operating as the slave apparatus.

A main processor operation frequency indicates an operation frequency of the main processor 21 in the information processing controller. A main processor usage rate indicates a usage rate in the main processor 21 with respect to all the programs that are operating now by means of the main processor 21. The main processor usage rate is a value indicating the ratio of throughput in use to the total throughput of a target main processor. For example, it is calculated on the basis of MIPS which is a unit for evaluating processor throughput, or computed based on the processor usage time per unit of time. A sub-processor usage rate to be set forth later is similarly found.

The number of sub-processors indicates the number of the sub-processors 23 provided for the information processing controller. The sub-processor ID is an identifier for identifying each of the sub-processors 23 in the information processing controller.

The sub-processor status indicates a status of each of the sub-processors 23, and there are a plurality of statuses, such as "unused", "reserved", and "busy". "Unused" shows that the sub-processor is neither being used now nor reserved for use. "Reserved" shows that it is not used now, but scheduled for use. "Busy" shows that it is currently in use.

The sub-processor usage rate is a usage rate of the sub-processor, with respect to a sub-processor program which is currently executed by the sub-processor, or reserved for execution by the sub-processor. In other words, the sub-processor usage rate indicates the current usage rate, if the sub-processor status is busy, and if the sub-processor status is reserved, it indicates a presumed usage rate to be used later.

A set of the sub-processor ID, the sub-processor status, and the sub-processor usage rate is set up for each of the sub-processors 23, and the number of groups corresponding to the sub-processors 23 in one information processing controller is set up.

A main memory total capacity and an amount of main memory used respectively indicate the total capacity and a capacity currently in use of the main memory 26 connected to the information processing controller.

The number of external memory units indicates the number of external memory units 28 connected to the information processing controller. An external memory unit ID is information for uniquely identifying the external memory unit 28 connected to the information processing controller. An external memory unit type ID indicates a type (for example, a hard disk, a CD±RW, a DVD±RW, a memory disk, an SRAM, a ROM, etc.) of the external memory unit.

An external memory unit total capacity and an amount of external memory unit used respectively indicate the total capacity and a capacity currently in use of the external memory unit 28 identified by the external memory unit ID.

A set of the external memory unit ID, the external memory unit type ID, the external memory unit total capacity, and the amount of external memory unit used is set up for each of the external memory units 28, and the number of the setups is the number of the external memory units 28 connected to the information processing controller. In other words, if a plurality of external memory units are connected to one information processing controller, a different external memory unit ID is assigned to each external memory unit, and also the external memory unit type ID, the external memory unit total capacity, and the amount of external memory unit used are managed separately.

(Execution of Software Cell)

The main processor 21 included in the information processing controller in a certain information processing apparatus generates a software cell of the above structure, and transmits the software cell through the network 9 to the information processing controllers in the information processing apparatus and other apparatuses. The information processing apparatus of a transmitter, the information processing apparatus of a destination, the information processing apparatus of a responding destination, and the information processing controller in each apparatus are identified by the above-mentioned transmitter ID, destination ID, and responding destination ID, respectively.

The main processor 21 included in the information processing controller in the information processing apparatus having received the software cell stores the software cell in the main memory 26. Furthermore, the destination main processor 21 reads the software cell, and performs processing of the DMA command contained in it.

In particular, the destination main processor 21 executes the load command first. Accordingly, information is loaded from the main memory address indicated by the load command into a predetermined area of the LS 24 in the sub-processor specified by the sub-processor ID and the LS address contained in the load command. The information loaded here is the sub-processor program or data included in the received software cell, or the other indicated data.

Next, the main processor 21 outputs the kick command to the sub-processor indicated by the sub-processor ID contained in the command, together with the program counter similarly contained in the kick command.

The indicated sub-processor executes the sub-processor program according to the kick command and the program counter. After storing the resulting execution product in the main memory 26, it notifies the main processor 21 that the execution is completed.

In addition, the processor which executes the software cell in the information processing controller in the destination information processing apparatus is not limited to the sub-processors 23, but it is also possible to specify that the main processor 21 should execute a program for main memory, such as a function program contained in the software cell.

In this case, the transmitter information processing apparatus transmits, to the destination information processing apparatus, the software cell whose DMA command is the load command instead of the sub-processor program, including the program for main memory and the data processed by the program for main memory, and causes the main memory 26 to store the program for main memory and the data processed by the program. Next, the transmitter information processing apparatus transmits, to the destination information processing apparatus, the software cell whose DMA command is the kick command or the function program execution command, including identifiers, such as the main processor ID regarding the information processing controller in the destination information processing apparatus, the main memory address, the function program ID (to be set forth later) for identifying the program for main memory, etc. and the program counter, and causes the main processor 21 to execute the program for main memory.

As described above, in the network system of the present invention, the transmitter information processing apparatus may transmit the sub-processor program or the program for main memory to the destination information processing apparatus by means of the software cell, load the sub-processor program, into the sub-processor 23 included in the information processing controller in the destination information processing apparatus, and also cause the destination information processing apparatus to execute the sub-processor program or the program for main memory.

If the program included in the received software cell is the sub-processor program, the information processing controller in the destination information processing apparatus loads the sub-processor program, into the specified sub-processor. The sub-processor program or the program for main memory included in the software cell is executed.

Therefore, even if a user does not operate the destination information processing apparatus, the sub-processor program or the program for main memory may automatically be executed by the information processing controller in the destination information processing apparatus.

Accordingly, the information processing apparatus, if the information processing controller in the instant apparatus does not have program for main memory, such as the sub-processor program or the function program, may acquire them from another information processing apparatus connected to the network. Furthermore, by transferring the data among the sub-processors by way of DMA, and by using the sand box as mentioned above, the process may be carried out at a high speed with high security, even if the data need to be processed in multiple steps within one information processing controller.

[Distributed Processing In Network System: FIGS. 5-15]

Figure 5:
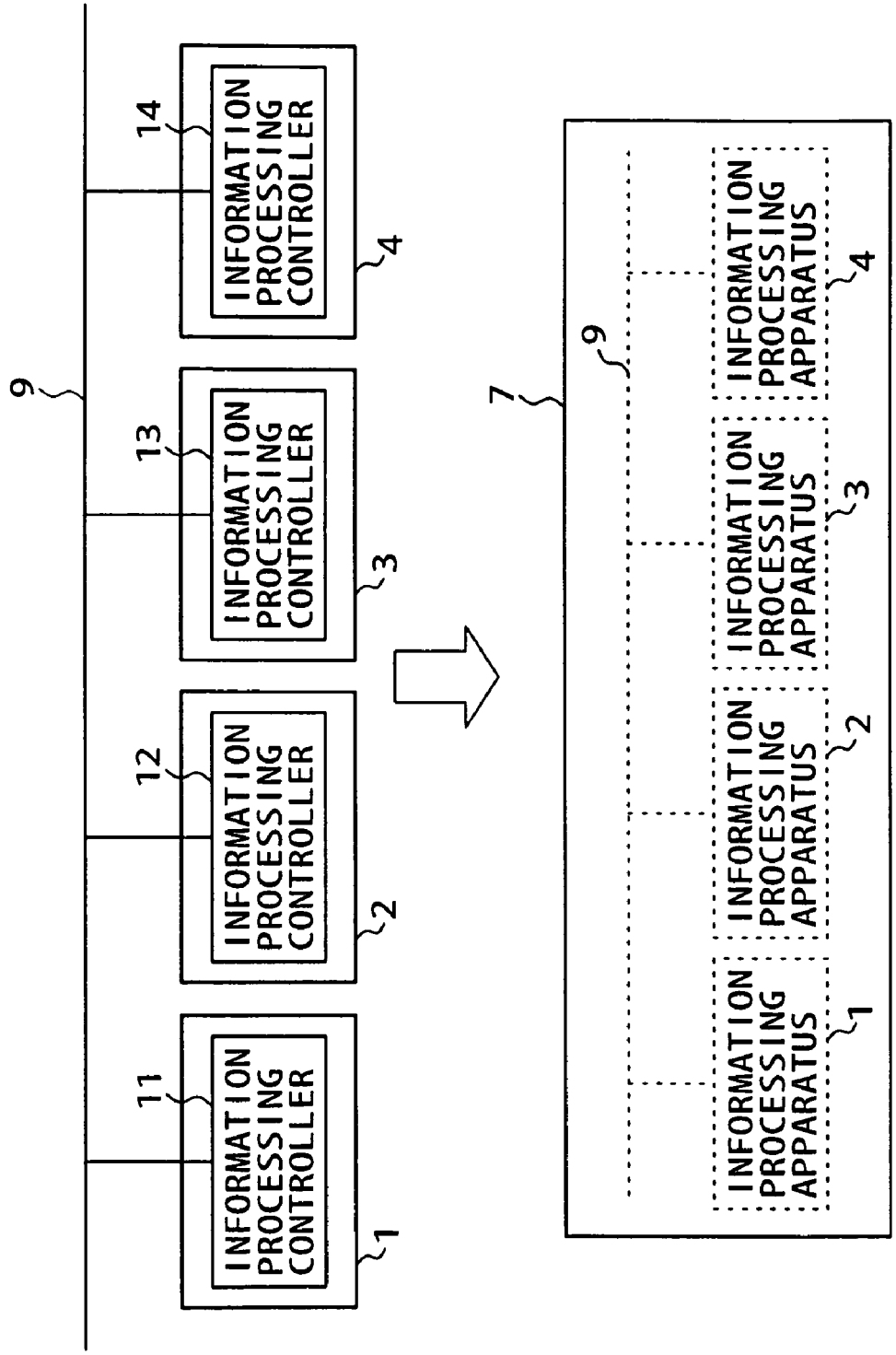
FIG. 5 is a diagram showing a status where a plurality of information processing apparatuses operate as a single virtual information processing apparatus.

As a result of distributed processing by use of the software cell, the plurality of information processing apparatuses 1, 2, 3, and 4 connected to the network 9 as shown in the upper part of FIG. 5 operate as a single virtual information processing apparatus 7, as shown in the lower part of FIG. 5. To achieve this, however, the following processes need to be carried out by the following structure.

(Software Structure of System and Loading of Computer Program)

A structure of software stored by the main memory 26 of each information processing controller is shown in FIG. 6. Such software (program) is recorded on the external memory unit 28 connected to the information processing controller, before the power is turned on for the information processing apparatus.

Each program is categorized into a control program, a function program, or a device driver according to the function or the feature.

Each information processing controller is provided with the same control program, which is executed by the main processor 21 of each information processing controller, and it includes an MS (master/slave) manager and a capability exchange program, as will be described later.

The function program is executed by the main processor 21, and provided for each information processing controller according to the information processing apparatus, such as for recording, for replay, for content search, etc.

The device driver is for input and output (transmission and reception) of the information processing controller (information processing apparatus), and provided for each information processing controller, according to the information processing apparatus for broadcast reception, monitor output, bit stream input and output, network input and output, etc.

After the information processing apparatus has been physically connected to the network 9 by means of a plug of a cable etc., a main power supply is turned on for the information processing apparatus. If the information processing apparatus is connected to the network 9 both electrically and functionally, the main processor 21 of the information processing controller for the information processing apparatus loads, into the main memory 26, each program belonging to the control program, and each program belonging to the device driver.

As a load procedure, firstly, by causing a DC 27 to execute a read-out command, the main processor 21 reads a program from the external memory unit 28. Further, by causing the DMAC 25 to execute a write-in command, it writes the program in the main memory 26.

Each program belonging to the function program may be arranged such that only a required program may be loaded if required. Alternatively, each program may be loaded immediately after turning-on the main power, similar to the program belonging to another category.

Here, each program belonging to the function program is not necessarily recorded on the external memory units 28 of all the information processing apparatuses connected to the network. If it is recorded on the external memory unit 28 of any one of the information processing apparatuses, it may be loaded from another information processing apparatus according to the above-mentioned method. As a result, as shown in the lower part of FIG. 5, the function program may be executed as the single virtual information processing apparatus 7.

As shown in the software cell of FIG. 3, the identifier which may uniquely identify each program is assigned to the function program as the function program ID. In a step of creating the function program, the function program ID is determined from the creation date and time, the information processing apparatus ID, etc.

The main processor 21 secures an area, in the main memory 26, for storing the apparatus data on the information processing apparatus (information regarding an operating status) where the main processor itself operates, and records the information, as an apparatus information table of the apparatus for itself. The apparatus data here is each information of the information processing apparatus ID et seq. as shown in FIG. 4.

(Determination of Master/Slave in System)

In the above-mentioned network system, at the time of turning-on the main power supply for a certain information processing apparatus, the main processor 21 of the information processing controller for the information processing apparatus loads a master/slave manager (hereinafter, referred to as MS manager) into the main memory 26, and executes the MS manager.

Detecting that the information processing apparatus in which the MS manager itself operates is connected to the network 9, the MS manager checks for the existence of another information processing apparatus connected to the same network 9. Here, "connection" or "existence" shows that the information processing apparatus is not only physically connected to the network 9, but also it is connected with the network 9 electrically and functionally, as described above.

Further, the information processing apparatus that operates itself is referred to as the instant apparatus, and another information processing apparatus is referred to as another apparatus. The apparatus shall mean the information processing apparatus.

It will be shown below how the MS manager checks for the existence of another information processing apparatus connected to the same network 9.

The MS manager generates a software cell where the DMA command is a status request command and the transmitter ID and the responding destination ID are for the information processing apparatus, and which does not specify a destination ID, transmits the software cell over the network to which the information processing apparatus is connected, and sets up a timer for checking the network connection. A timeout period of the timer is arranged to be 10 minutes, for example.

If another information processing apparatus is connected to the network system, the another apparatus receives the software cell of the above-mentioned status request command, and transmits the software cell where the DMA command is the status return command, and which includes its own apparatus data (the another apparatus) as the data, to the information processing apparatus having issued the status request command specified by the above-mentioned responding destination ID. The software cell of this status return command includes at least, information which specify the another apparatus (the information processing apparatus ID, information regarding the main processor, information regarding sub-processor, etc.) and the MS status of the another apparatus.

Issuing the status request command, the MS manager of the information processing apparatus monitors reception of the software cell of the status return command transmitted from another apparatus on the network, until the timer for checking the above-mentioned network connection times out. As a result, if the status return command which shows MS status=0 (master apparatus) is received, the MS status in the apparatus information table of the instant apparatus is set as "1", whereby the apparatus turns into a slave apparatus.

On the other hand, if the status return command is not received at all until the timer for checking the above-mentioned network connection times out, or if the status return command which shows MS status=0 (master apparatus) is not received, the MS status in the apparatus information table of the instant apparatus is set as "0", whereby the apparatus turns into a master apparatus.

In other words, in a status where neither of the apparatuses is connected to the network 9, or a status where a master apparatus does not reside on the network 9, if a new information processing apparatus is connected to the network 9, then the apparatus will be automatically set up as a master apparatus. On the other hand, in a status where a master apparatus already resides on the network 9, if a new information processing apparatus is connected to the network 9, the apparatus will be automatically set up as a slave apparatus.

With respect to both the master apparatus and the slave apparatus, the MS manager monitors the status of another apparatus, by transmitting the status request command to another apparatus on the network 9 periodically, and referring for status information. As a result, if the main power supply of the information processing apparatus connected to the network 9 is turned off, or the information processing apparatus is disconnected from the network 9, if a connection status of the network 9 has changed, such as if the status return command is not answered by a specific other apparatus within a predetermined period set for judgment in advance, if a new information processing apparatus is connected to the network 9, etc., then the information is notified to a capability exchange program.

(Acquisition of Apparatus Data in Master Apparatus and Slave Apparatus)

If an inquiry of another apparatus on the network 9 and a notice of completion of setting the MS status of the instant apparatus are received from the MS manager, the main processor 21 executes the capability exchange program.

If the instant apparatus is a master apparatus, the capability exchange program acquires the apparatus data on all other apparatuses connected to the network 9, i.e., the apparatus data on every slave apparatus.

As described above, acquisition of the apparatus data on another apparatus may be achieved in such a way that the DMA command generates the software cell which is the status request command, transmits it to another apparatus, and then receives, from another apparatus, the software cell where the DMA command is the status return command, and which includes the apparatus data on another apparatus as the data.

The capability exchange program secures the area, in the main memory 26 of the instant apparatus, for storing the apparatus data on all other apparatuses (every slave apparatus) connected to the network 9, similar to the apparatus information table of the instant apparatus which is the master apparatus, and records these information as the apparatus information table of other apparatuses (slave apparatuses).

In other words, the apparatus data on all the information processing apparatuses connected to the network 9, including the instant apparatus itself, are recorded on the main memory 26 of the master apparatus as the apparatus information table.

On the other hand, if the instant apparatus is the slave apparatus, the capability exchange program acquires the apparatus data on all other apparatuses connected to the network 9, i.e., the apparatus data on each slave apparatus other than the master apparatus and the instant apparatus, and records the information processing apparatus ID contained in these apparatus data and the MS status on the main memory 26 of the instant apparatus.

In other words, on the main memory 26 of the slave apparatus, the apparatus data regarding the instant apparatus is recorded in the apparatus information table, and the information processing apparatus ID's and the MS statuses of the master apparatus and each slave apparatus other than the instant apparatus connected to the network 9 is recorded in another apparatus information table.

Further, with respect to either the master apparatus or the slave apparatus, if it is notified by the MS manager that an new information processing apparatus is connected to the network 9 as described above, the capability exchange program acquires the apparatus data on the information processing apparatus, and records it on the main memory 26 as described above.

In addition, the MS manager and the capability exchange program may be executed not only by the main processor 21 but also by any one of the sub-processors 23. Further, the MS manager and the capability exchange program are desirably resident programs which always operate while the main power supply of information processing apparatus is in operation.

(Case where Information Processing Apparatus Is Disconnected from Network)

With respect to either the master apparatus or the slave apparatus, as described above, if it is notified by the MS manager that the main power supply of the information processing apparatus connected to the network 9 is turned off, or the information processing apparatus is disconnected from the network 9, the capability exchange program deletes the apparatus information table of the information processing apparatus from the main memory 26 of the instant apparatus.

Furthermore, if the information processing apparatus thus disconnected from the network 9 is the master apparatus, a new master apparatus is determined in accordance with the following methods.

In particular, for example, each of the information processing apparatuses which are not disconnected from the network 9 replaces the information processing apparatus ID's of its own apparatus and other apparatuses by values, and compare the information processing apparatus ID of its own apparatus with the information processing apparatus ID's of other apparatuses. If the information processing apparatus ID of its own apparatus is the minimum among the information processing apparatuses which are not disconnected from the network 9, the slave apparatus turns into a master apparatus, sets the MS status to "0". As a master apparatus, as described above, it acquires the apparatus data on all other apparatuses (every slave apparatus) connected to the network 9, records them on the main memory 26.

(Distributed Processing Based on Apparatus Data)

As shown in the lower part of FIG. 5, in order to operate the plurality of information processing apparatuses 1, 2, 3, and 4 connected to the network 9 as the single virtual information processing apparatus 7, the master apparatus needs to know a user's operation and an operating status of the slave apparatus.

Figure 7:
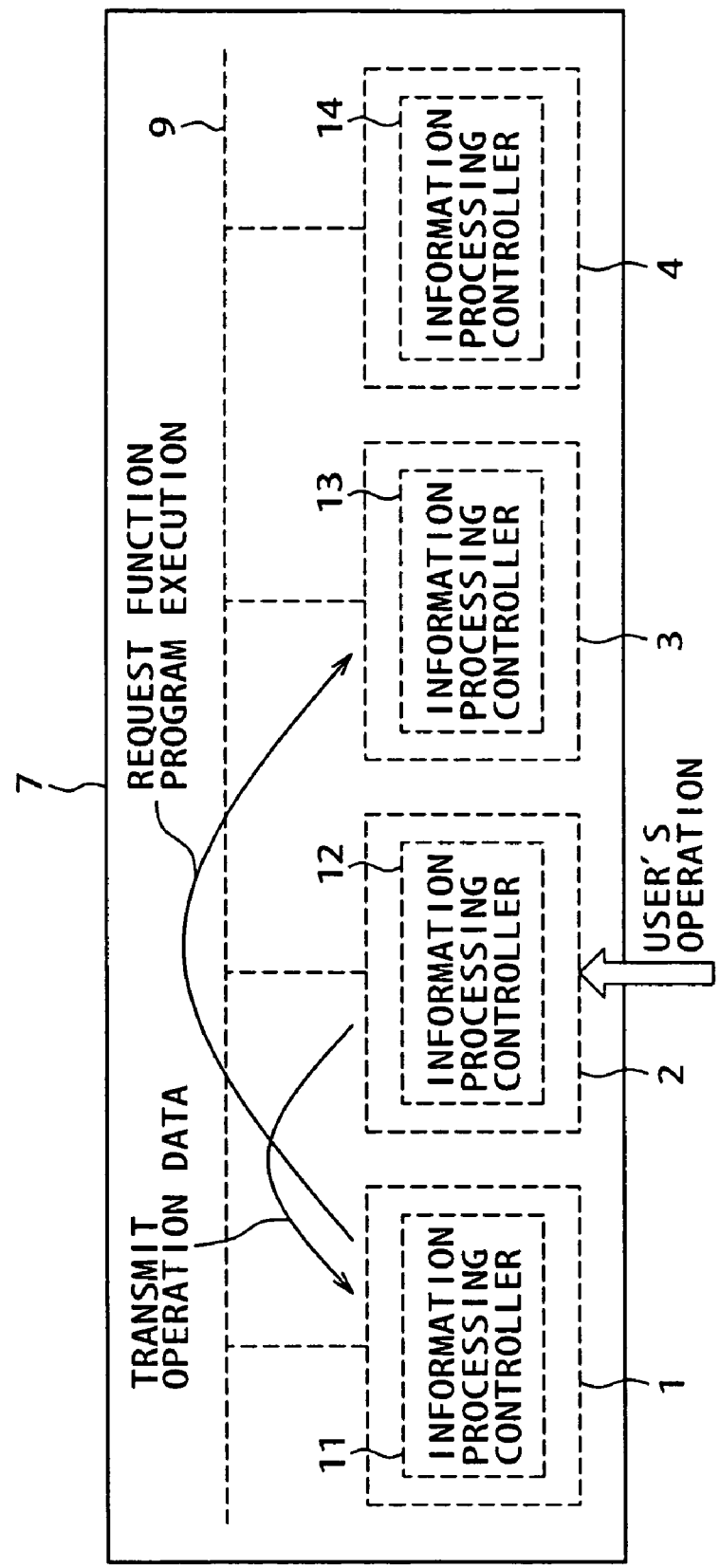
FIG. 7 is a diagram showing a status where four sets of information processing apparatuses operate as a single virtual information processing apparatus.

FIG. 7 shows a status where the four sets of information processing apparatuses operate as the single virtual information processing apparatus 7. Suppose that the information processing apparatus 1 operates as a master apparatus and the information processing apparatuses 2, 3, and 4 operate as slave apparatuses A, B, and C.

If the user operates the information processing apparatus connected to the network 9, and if the master apparatus 1 is to be operated, its operation data is directly obtained by the master apparatus 1. If the slave apparatus is to be operated, its operation data is transmitted to the master apparatus 1 from the operated slave apparatus. In other words, the operation data is always obtained by the master apparatus 1 irrespective of any of the master apparatus 1 and the slave apparatus to be operated by the user. Transmission of the operation data is performed, for example, by the software cell whose DMA command is an operation data transmission command.

Further, the main processor 21-1 included in the information processing controller 11 in the master apparatus 1 selects a function program to perform corresponding to the operation data. If required in this case, the main processor 21-1 included in the information processing controller 11 in the master apparatus 1 loads the function program from the external memory unit 28-1 and 28-2 of the instant apparatus into the main memory 26-1 according to the above-mentioned method. However, another information processing apparatus (slave apparatus) may transmit the function program to the master apparatus 1.

In the function program, required specifications regarding the apparatus, needed for each execution module thereof, are defined, such as the information processing apparatus classification ID expressed as data as shown in FIG. 4, a throughput of the main processor or the sub-processor, the amount of main memory used, restrictions regarding the external memory unit, etc.

The main processor 21-1 included in the information processing controller 11 in the master apparatus 1 reads the above-mentioned required specifications needed for each function program. Further, it reads the apparatus data regarding each information processing apparatus, with reference to the apparatus information table recorded on the main memory 26-1 beforehand by the capability exchange program. The apparatus data here show each data of the information processing apparatus ID et seq. as shown in FIG. 4, and are the information regarding the main processor, the sub-processor, the main memory, and the external memory unit.

The main processor 21-1 included in the information processing controller 11 in the master apparatus 1 respectively compares the above-mentioned apparatus data on each information processing apparatus connected to the network 9, with the above-mentioned required specifications needed for function program execution.

For example, if the function program needs a recording function, only the information processing apparatus having the recording function is specified and extracted, based on the information processing apparatus classification ID. Furthermore, the slave apparatus which may secure the throughput of the main processor or the sub-processor required in order to execute the function program, the amount of main memory used, and the restrictions regarding the external memory unit, is specified as an execution request candidate apparatus. Here, if a plurality of execution request candidate apparatuses are specified, one execution request candidate apparatus is specified and selected from the candidate apparatuses.

If a slave apparatus which carries out an execution request is specified, the main processor 21-1 included in the information processing controller 11 in the master apparatus 1 updates the apparatus information table of the slave apparatus which is recorded on the main memory 26-1 included in the information processing controller 11 in the instant apparatus, with respect to the specified slave apparatus.

Furthermore, the main processor 21-1 included in the information processing controller 11 in the master apparatus 1 generates a software cell where the DMA command is the function program execution command, sets the information of the required sub-processors with respect to the function program and the sand box size (see FIG. 3), at the cell interface of the software cell, and transmits them to the above-mentioned slave apparatus which is required to carry out the above-mentioned execution.

Being required to execute the function program, the slave apparatus executes the function program and updates the apparatus information table of its own. If required in that case, the main processor 21 included in the information processing controller in the slave apparatus loads the function program and the sub-processor program that operate together with the function program from the external memory unit 28 of the instant apparatus into the main memory 26 according to the above-mentioned methods.

If the necessary function program or the sub-processor program that operate together with the function program is not recorded in the external memory unit 28 of the slave apparatus which is required to execute the function program, the system may be arranged such that another information processing apparatus may transmit the function program, as the above-mentioned program for main memory, to the slave apparatus required to execute the function program.

The sub-processor program may be executed in another information processing apparatus by using the load command and kick command described above.

After completion of execution of the function program, the main processor 21 included in the information processing controller in the slave apparatus having executed the function program transmits a notice of completion to the main processor 21-1 included in the information processing controller 11 in the master apparatus 1, and also updates the apparatus information table of the instant apparatus. The main processor 21-1 included in the information processing controller 11 in the master apparatus 1 receives the notice of completion, and updates the apparatus information table of the slave apparatus having executed the function program.

The main processor 21-1 included in the information processing controller 11 in the master apparatus 1 may select the instant apparatus as an information processing apparatus which may perform the function program, as a result of reference to the apparatus information table of the instant apparatus and other apparatuses. In this case, the master apparatus 1 executes the function program.

Figure 8:
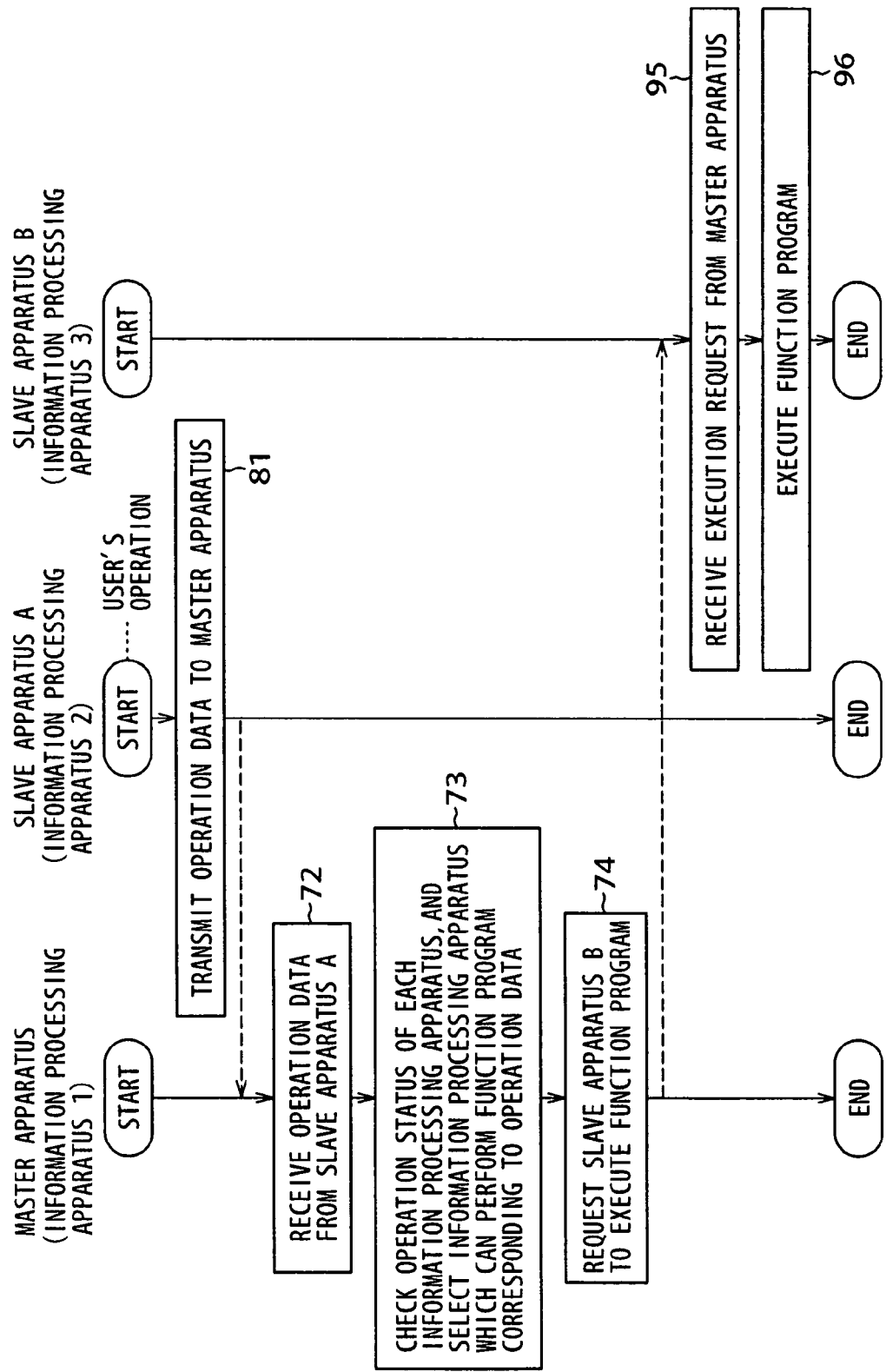
FIG. 8 is a chart showing an example of distributed processing in the system of FIG. 7.

In the example of FIG. 7, the user operates a slave apparatus A (information processing apparatus 2), and another slave apparatus B (information processing apparatus 3) executes the function program according to the operation. FIG. 8 shows the example of distributed processing as mentioned above.

In the example of FIG. 8, when the user operates the slave apparatus A, the distributed processing is started for the entire network system including the slave apparatus A. First, the slave apparatus A, in step 81, transmits the operation data to the master apparatus 1.

In step 72, the master apparatus 1 receives the operation data, and moves the process to step 73 further. Referring to the apparatus information table of the instant apparatus and other apparatuses, recorded on the main memory 26-1 of the instant apparatus, it checks the operating status of each information processing apparatus, and selects the information processing apparatus which may execute the function program corresponding to the received operation data. In this example, the slave apparatus B is selected.

Next, in step 74 the master apparatus 1 requests the selected slave apparatus B to execute the function program.

In step 95, the slave apparatus B receives the execution request, moves the process to step 96 further, and executes the function program which is required to be executed.

As described above, the user may operate the plurality of information processing apparatuses 1, 2, 3, and 4 as the single virtual information processing apparatus 7, without operating another information processing apparatus, by operating only single information processing apparatus.

(Example of Each Information Processing Apparatus and System)

Figure 9:
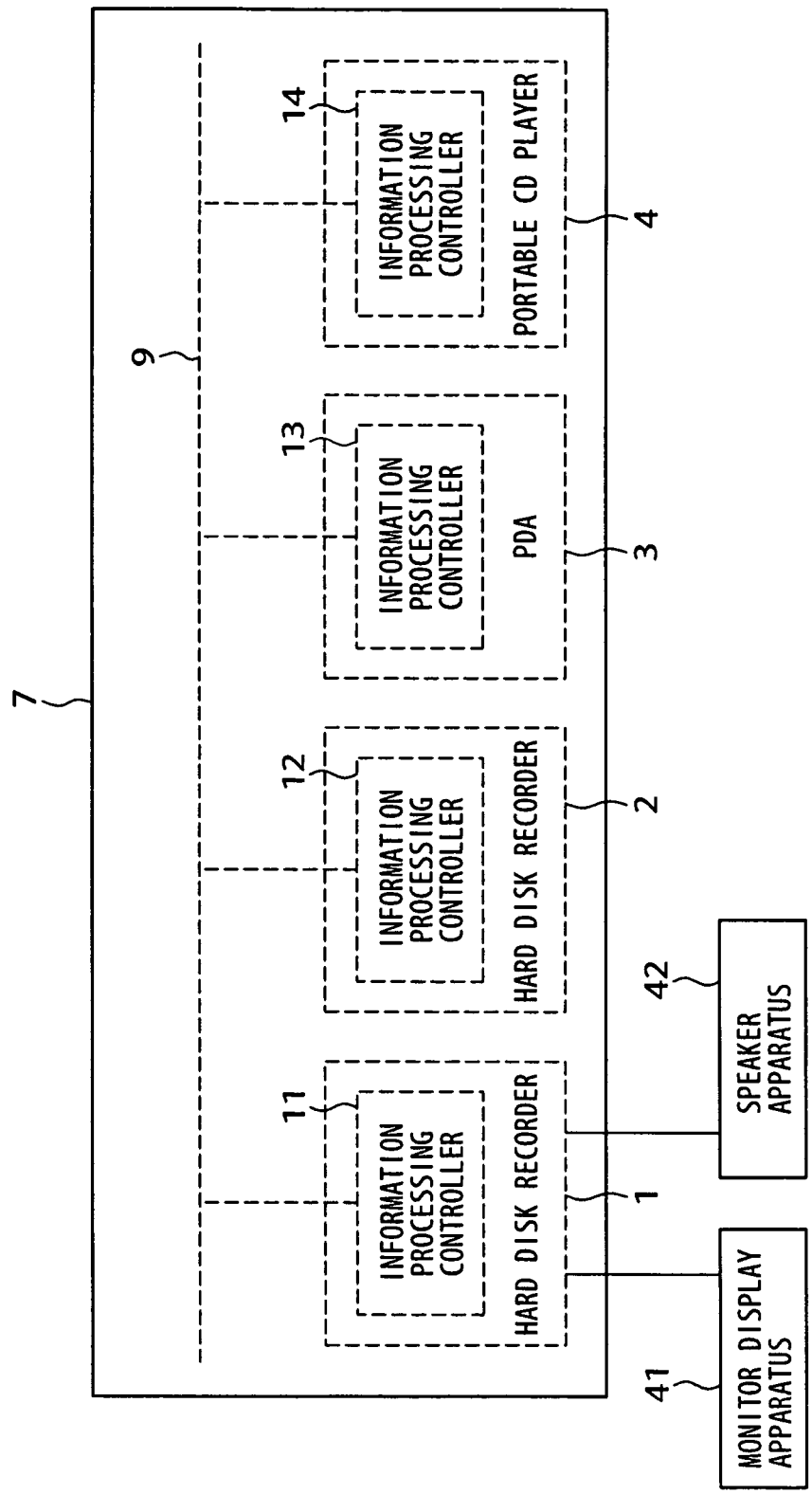
FIG. 9 is a chart showing specific examples of each information processing apparatus and the system.

The information processing apparatuses 1, 2, 3, and 4 connected with one another through the network 9 may be any type of apparatuses that basically carry out the information processing by means of the above-mentioned information processing controllers 11, 12, 13, and 14. FIG. 9 shows an example.

Figure 10:
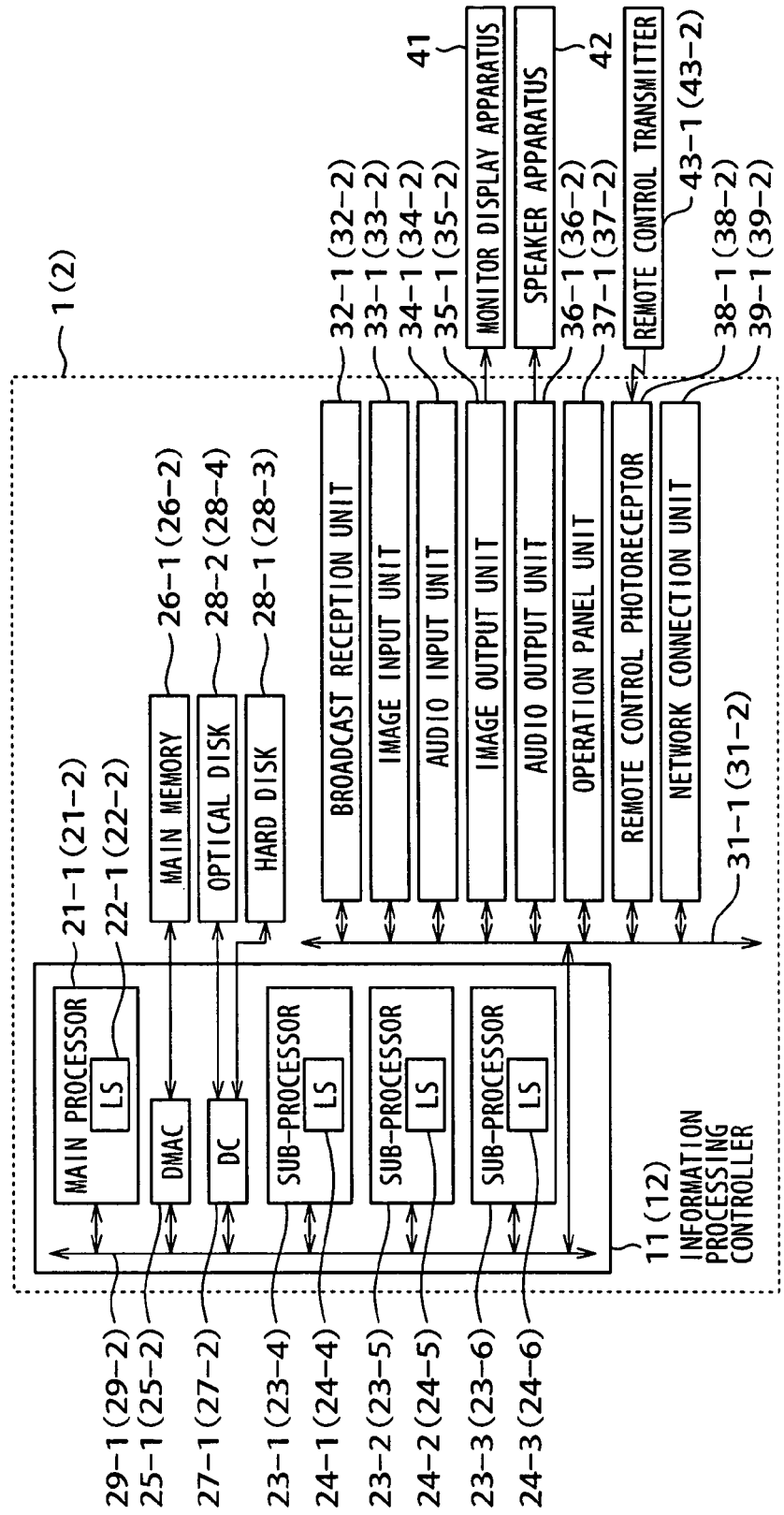
FIG. 10 is a diagram showing an example of a hardware structure of a hard disk recorder in FIG. 9.

In this example, the information processing apparatus 1 provided with the information processing controller 11 is a hard disk recorder as shown in FIG. 10. As for its hardware structure, a hard disk is built in as the external memory unit 28-1 as shown in FIG. 1. It is arranged such that optical discs, such as a DVD±R/RW, a CD±R/RW, and a Blu-ray Disc (registered trademark) may be mounted as the external memory unit 28-2 as shown in FIG. 1, and that a broadcast reception unit 32-1, an image input unit 33-1, an audio input unit 34-1, an image output unit 35-1, an audio output unit 36-1, an operation panel unit 37-1, a remote control photoreceptor 38-1, and a network connection unit 39-1 are connected to a bus 31-1 which is connected to the bus 29-1 of the information processing controller 11.

The broadcast reception unit 32-1, the image input unit 33-1, and the audio input unit 34-1 receive a broadcast signal, or receive an image signal and an audio signal from the outside of the information processing apparatus 1, and respectively convert them into digitized data in a predetermined format, which are transmitted through the bus 31-1 in order for the information processing controller 11 to carry out the processing. The image output unit 35-1 and the audio output unit 36-1 process the image data and audio data transmitted through the bus 31-1 from the information processing controller 11, leave them to be the digitized data as they are or convert them into an analog signal, and transmit them to the outside of the information processing apparatus 1. The remote control photoreceptor 38-1 receives a remote control (remote control) infrared signal from a remote control transmitter 43-1.

As shown in FIGS. 9 and 10, a monitor display apparatus 41 and a speaker apparatus 42 are respectively connected to the image output unit 35-1 and the audio output unit 36-1 of the information processing apparatus (hard disk recorder) 1. The information processing apparatus 2 provided with the information processing controller 12 of the example of FIG. 9 is also a hard disk recorder, and arranged similarly to the information processing apparatus 1 as indicated by providing reference numerals in parentheses in FIG. 10. However, for example, as shown in FIG. 9 neither a monitor display apparatus nor a speaker apparatus is connected to the information processing apparatus (hard disk recorder) 2.

Figure 11:
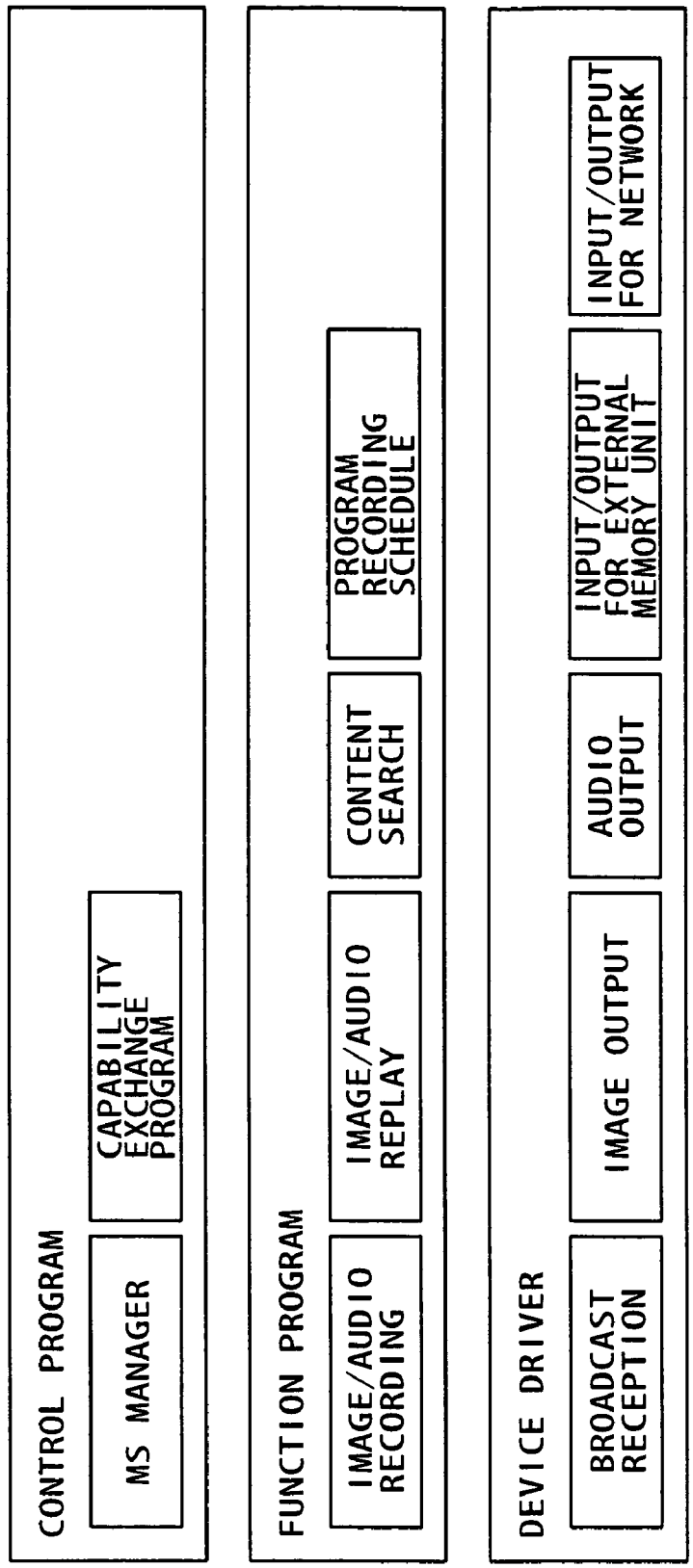
FIG. 11 is a diagram showing an example of a software structure of the hard disk recorder in FIG. 9.

A software structure of the information processing apparatuses (hard disk recorders) 1 and 2 i.e. the information processing controllers 11 and 12 is arranged as shown in FIG. 11. The MS manager and the capability exchange program are provided as control programs. A program for image/audio recording, image/audio replay, content search, and program recording schedule is provided as the function program. A program for broadcast reception, image output, audio output, input/output for external memory unit, and input/output for network is provided as the device driver.

Figure 12:
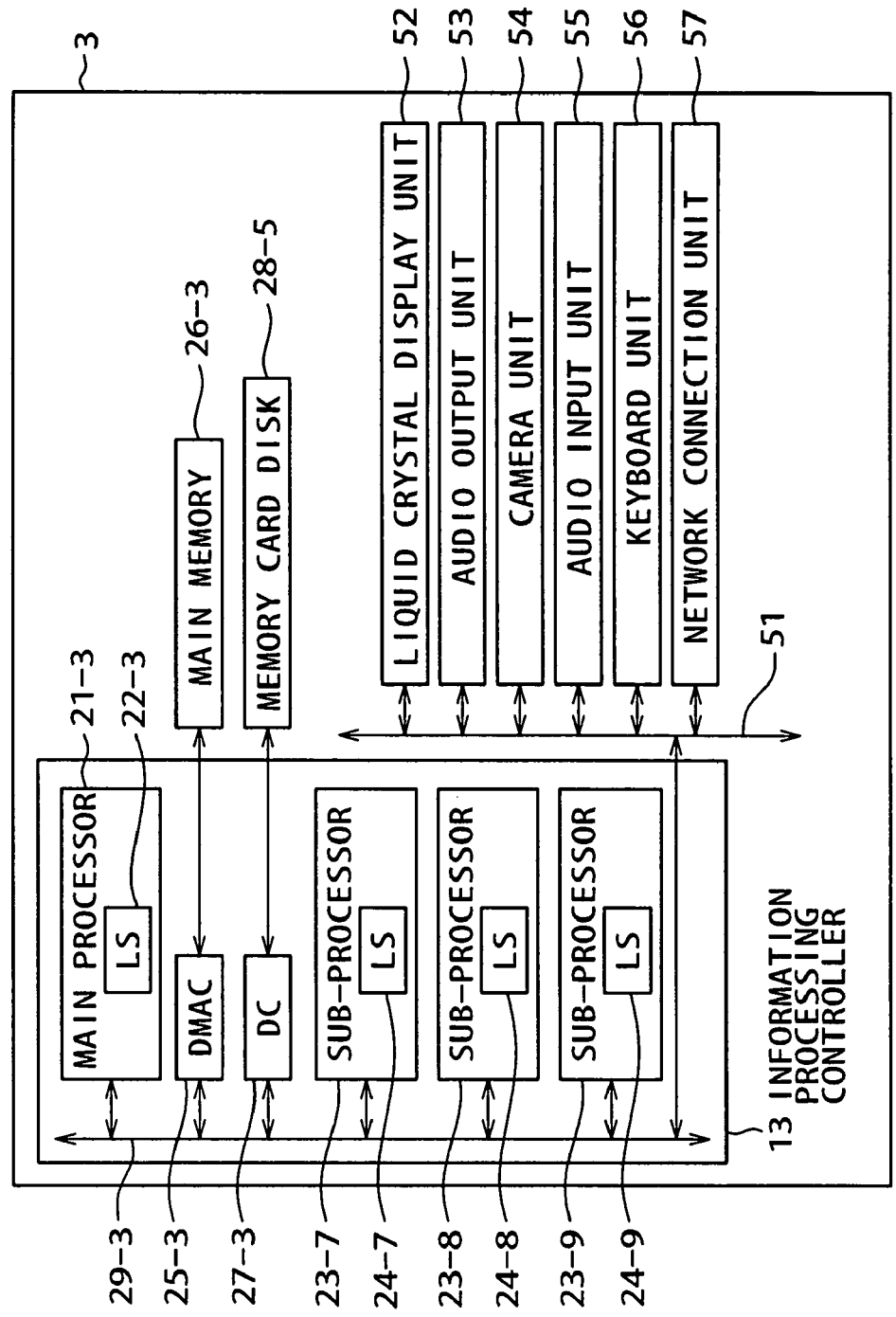
FIG. 12 is a diagram showing an example of a hardware structure of the PDA in FIG. 9.

The information processing apparatus 3 provided with the information processing controller 13 of the example of FIG. 9 is a PDA (Personal Digital Assistants). As shown in FIG. 12, its hardware structure is arranged such that a memory card disk may be mounted as an external memory unit 28-5 shown in FIG. 1, and that a liquid crystal display unit 52, an audio output unit 53, a camera unit 54, an audio input unit 55, a keyboard unit 56, and a network connection unit 57 are connected to a bus 51 which is connected to a bus 29-3 of the information processing controller 13.

In addition, the information processing controller 13 (its inside is not shown in FIG. 1) includes a main processor 21-3, sub-processors 23-7, 23-8, 23-9, a DMAC (Direct Memory Access Controller) 25-3, a DC (Disc Controller) 27-3, and a bus 29-3. The main processor 21-3 includes an LS (Local Storage) 22-3, and the sub-processors 23-7, 23-8, and 23-9 respectively have LS's (Local Storage) 24-7, 24-8, and 24-9.

Figure 13:
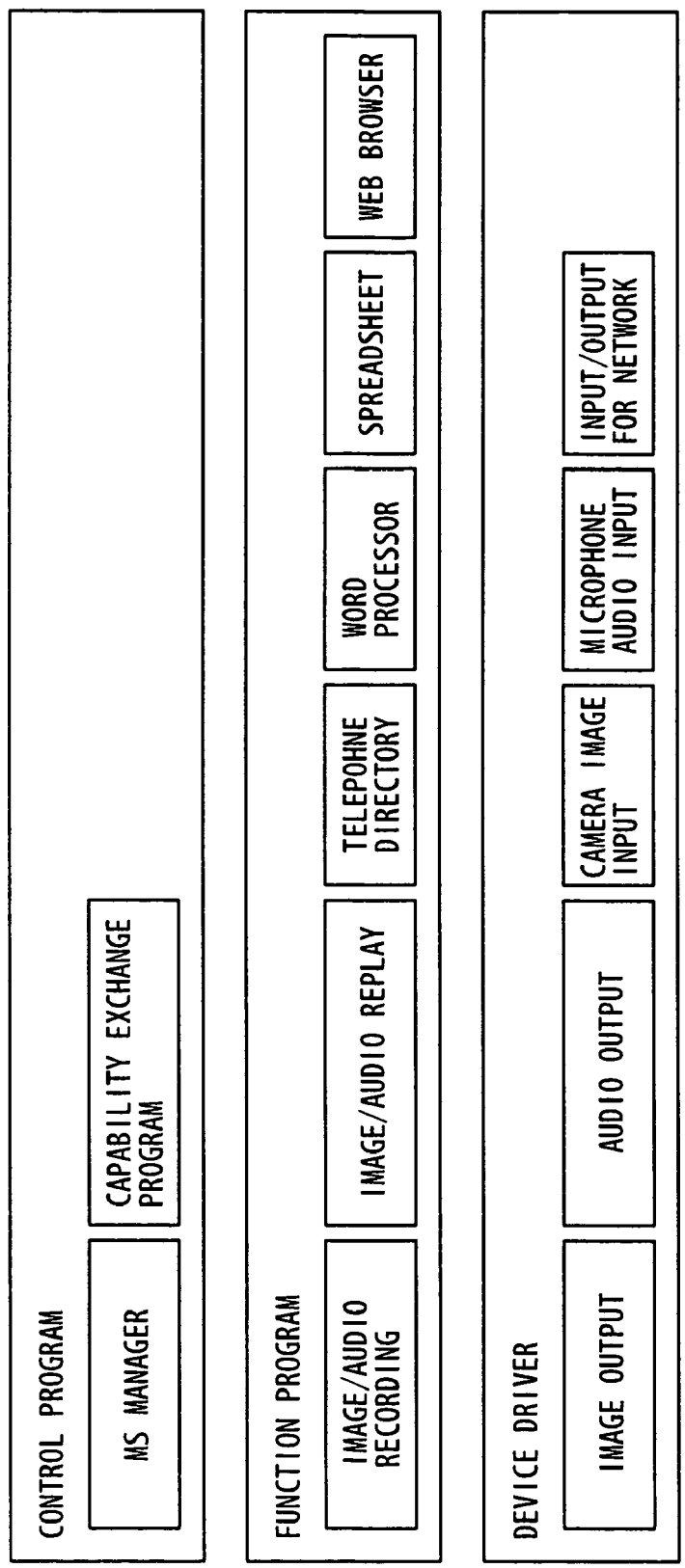
FIG. 13 is a diagram showing an example of a software structure of the PDA in FIG. 9.

A software structure of the information processing apparatus (PDA) 3 i.e., the information processing controller 13 is arranged as shown in FIG. 13. The MS manager and the capability exchange program are provided as the control program. A program for image/audio recording, image/audio replay, a telephone directory, a word processor, and a spreadsheet, and also a web browser are provided as a function program. A program for image output, audio output, camera image input, microphone audio input, and network input and output is provided as the device driver.

Figure 14:
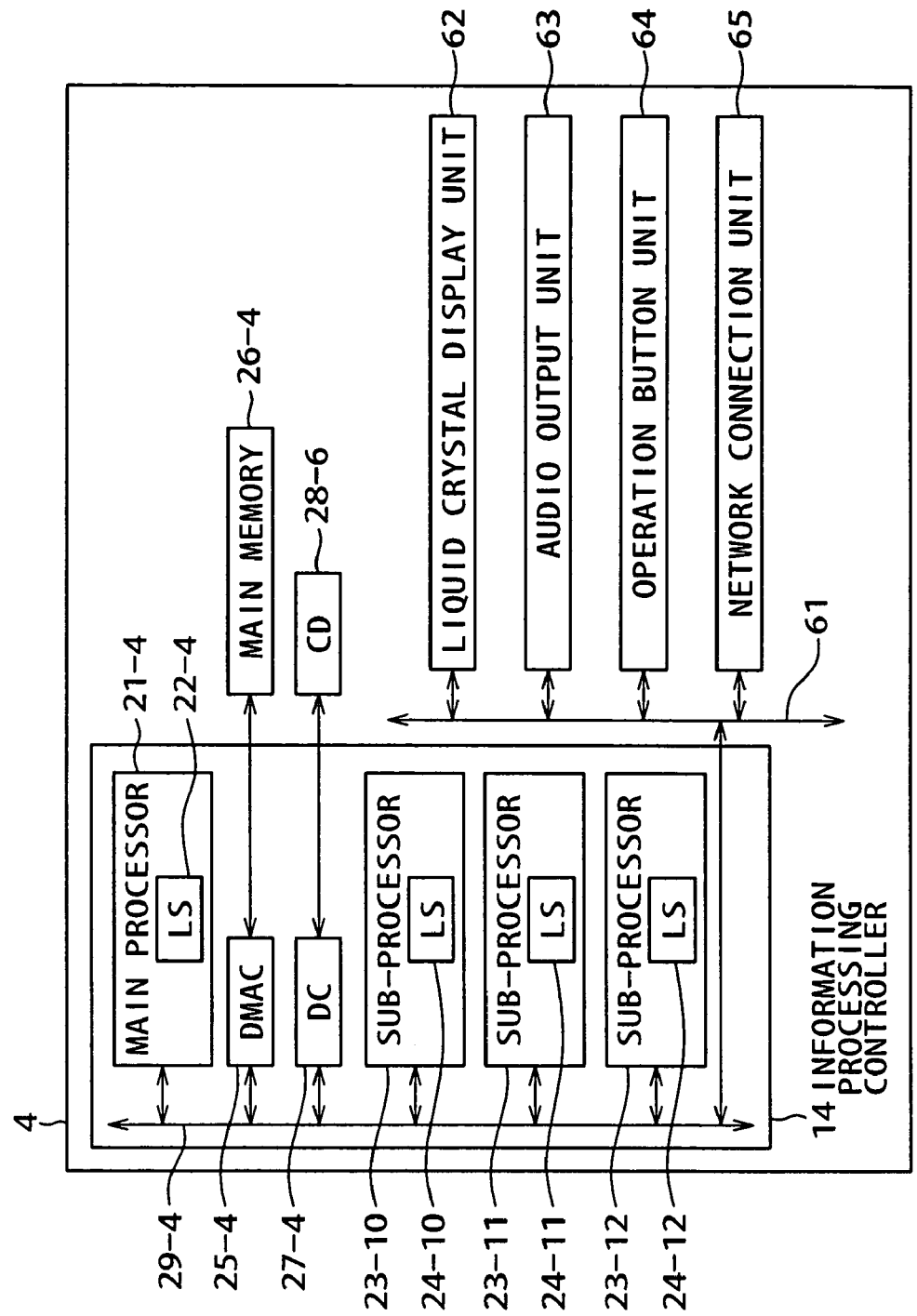
FIG. 14 is a diagram showing an example of a hardware structure of the portable CD player in FIG. 9.

The information processing apparatus 4 provided with the information processing controller 14 of the example of FIG. 9 is a portable CD player. As shown in FIG. 14, its hardware structure is arranged such that a CD (Compact Disc) may be mounted as an external memory unit 28-6 shown in FIG. 1, and that a liquid crystal display unit 62, an audio output unit 63, an operation button unit 64, and a network connection unit 65 are connected to a bus 61 which is connected to a bus 29-4 of the information processing controller 14.

In addition, the information processing controller 14 (its inside is not shown in FIG. 1) includes a main processor 21-4, sub-processors 23-10, 23-11, 23-12, a DMAC (Direct-Memory-Access Controller) 25-4, a DC (Disc Controller) 27-4, and the bus 29-4. The main processor 21-4 has an LS (local storage) 22-4. The sub-processors 23-10, 23-11, and 23-12 respectively have LS's (local storage) 24-10, 24-11, and 24-12.

A software structure of the information processing apparatus (portable CD player) 4 i.e. the information processing controller 14 is arranged as shown in FIG. 15. The MS manager and the capability exchange program are provided as the control program. A program for music replay is provided as the function program. A program for audio output, CD control, and network input and output is provided as the device driver.

In the above-mentioned network system of the example in FIG. 9, it is supposed that the information processing apparatuses 1, 3, and 4 are connected over the network 9, the information processing apparatus 1 is set up as the master apparatus (MS status=0), and the information processing apparatuses 3 and 4 are set up as the slave apparatuses (MS status=1).

In this status, when the information processing apparatus 2 is newly connected to the network 9, by way of the method as described above, the MS manager which is being executed by the main processor 21-2 included in the information processing controller 12 in the information processing apparatus 2 asks other information processing apparatuses 1, 3, and 4 for the MS statuses, recognizes that the information processing apparatus I already exists as the master apparatus, and sets the instant apparatus (information processing apparatus 2) as the slave apparatus (MS status=1). Further, the information processing apparatus 1 set as the master apparatus collects the apparatus data on each of the apparatuses including the newly added information processing apparatus 2, and updates the apparatus information table in the main memory 26-1.

An example in such a case will be shown where an operation of recording schedule of a broadcast program for two hours is performed by the user by means of the information processing apparatus (PDA) 3 which is the slave apparatus.

In this case, the information processing apparatus (PDA) 3 which is the slave apparatus receives, from a user, the input of the recording schedule data which include information, such as recording start time, recording finish time, a broadcast channel for recording, and recording quality, generates a software cell containing a recording schedule command as the recording schedule data and the DMA command, and transmits them to the information processing apparatus 1 which is the master apparatus.

Receiving the software cell in which the DMA command is the recording schedule command, the main processor 21-1 included in the information processing controller 11 in the information processing apparatus 1 reads the recording schedule command and specifies the information processing apparatus which may execute the recording schedule command, with reference to the apparatus information table in the main memory 26-1.

First, the main processor 21-1 reads the information processing apparatus classification ID of each of the information processing apparatuses 1, 2, 3, and 4 contained in the apparatus information table, and extracts the information processing apparatus which may execute a function program corresponding to the recording schedule command. Here, the information processing apparatuses 1 and 2 which have the information processing apparatus classification ID showing the recording function are specified as candidate apparatuses, and the information processing apparatuses 3 and 4 are excepted from the candidate apparatuses.

Next, with reference to the apparatus information table, the main processor 21-1 included in the information processing controller 11 in the information processing apparatus 1 which is the master apparatus, reads the information regarding apparatuses, such as the throughput of the main processors or the sub-processors, information regarding the main memory of the information processing apparatuses 1 and 2, and determines whether or not the information processing apparatuses 1 and 2 meet the required specifications needed for execution of a function program corresponding to the recording schedule command. Here, it is assumed that both the information processing apparatuses 1 and 2 meet the required specifications needed for execution of a function program corresponding to the recording schedule command.

Further, with reference to the apparatus information table, the main processor 21-1 reads the information regarding the external memory unit of the information processing apparatuses 1 and 2, and determines whether or not a free space of the external memory unit satisfies a capacity required to execute the recording schedule command. Since the information processing apparatuses 1 and 2 are hard disk recorders, the differences respectively between the total capacities and quantities used of the hard disks 28-1 and 28-3 are equivalent to respective free spaces.

In this case, it is assumed that the free space of the hard disk 28-1 of the information processing apparatus 1 is 10 minutes, converted into recording time, and that the free space of the hard disk 28-3 of the information processing apparatus 2 is 20 hours, converted into recording time.

At this stage, the main processor 21-1 included in the information processing controller 11 in the information processing apparatus 1 which is the master apparatus, specifies the information processing apparatus which may secure a free space for two hours required to execute the recording schedule command, as a slave apparatus required for execution.

As a result, only the information processing apparatus 2 is selected as the slave apparatus required for execution. The main processor 21-1 included in the information processing controller 11 in the information processing apparatus 1 which is the master apparatus, transmits the recording schedule command including the recording schedule data transmitted from the information processing apparatus 3 operated by the user, to the information processing apparatus 2, and requires execution of recording schedule of the above-mentioned broadcast program for two hours.

Further, the main processor 21-2 included in the information processing controller 12 in the information processing apparatus 2 analyzes the recording schedule command, loads the function program required for recording from the hard disk 28-3 which is the external memory unit into the main memory 26-2, and performs the recording according to the recording schedule data. As a result, the image/audio data of the broadcast program for two hours which is scheduled for recording is recorded on the hard disk 28-3 of the information processing apparatus 2.

Accordingly, also in the network system of the example of FIG. 9, the user may operate the plurality of information processing apparatuses 1, 2, 3, and 4 as the single virtual information processing apparatus 7, without operating other information processing apparatuses, by operating only single information processing apparatus.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing apparatus which is coupled to a plurality of other information processing apparatuses through a network, the information processing apparatus comprising:
   a processor; and
   a memory device storing instructions which when executed by the processor, causes the processor to:
   (a) collect information regarding resources and operating statuses of the other information processing apparatuses;
   (b) create an apparatus information table by:
      (i) for each of the other information processing apparatuses, transmitting one of a plurality of first software cells to said other information processing apparatus, said transmitted first software cell including a direct memory access command, each of said other information processing apparatuses being configured to execute said transmitted direct memory access command, the apparatus information table including:
         (A) apparatus data associated with all the other information processing apparatuses when the information processing apparatus is in a master status; and
         (B) identifications associated with all the other information processing apparatuses and the master/slave statuses associated with all the other information processing apparatuses on the network when the information processing apparatus is in a slave status, the first software cells requesting transmissions of information regarding the other information processing apparatuses; and
      (ii) for each of the other information processing apparatuses, receiving one of a plurality of second software cells as a reply from said other information processing apparatus, said received second software cell including a status return command;
   (c) exchange information regarding capability with the other information processing apparatuses by transmitting one of the first software cells which includes information regarding own apparatus as the reply to the other information processing apparatus if the information processing apparatus receives one of the second software cells which requests the transmission of information regarding the information processing apparatus from the other information processing apparatus; and
   (d) upon connection to the network of an additional information processing apparatus which was not previously connected to the network, collect classification identification information of said information processing apparatus, said classification identification information indicating at least one of a feature and a function of said information processing apparatus, wherein the apparatus data includes information processing apparatus identification information which is generated when powering on said information processing apparatus;
   (e) compare information regarding a resource required to execute a function program, with information regarding the resource and the operating status in the apparatus information table; and
   (f) specify one of the information processing apparatuses capable of executing the function program if the function program retained in the information processing apparatus is executed; and (g) transmit one of the first software cells which requests an execution of the function program to the specified information processing apparatus.

2. The information processing apparatus according to claim 1, wherein the instructions further cause the processor to:

upon connection to the network of the additional information processing apparatus which was not previously connected to the network, collect information regarding a resource and an operating status of the additional information processing apparatus and update the apparatus information table.

3. The information processing apparatus according to claim 1, wherein:

the other information processing apparatus has a plurality of processors for processing the function program; and the instructions further cause the processor to collect information regarding a resource and an operating status of each of the plurality of processors in the other information processing apparatus, and save the information in the apparatus information table.

4. The information processing apparatus according to claim 1, wherein information processing apparatus identification information of the information processing apparatus is generated by the information processing apparatus based at least in part on one or more of: (i) a date; and (ii) a time, of powering on of the information processing apparatus.

5. The information processing apparatus according to claim 1, wherein, upon disconnection from the network of an information processing apparatus in a master status, at least one of the other information processing apparatuses in a slave status changes to a master status based, at least in part, on a comparison of the information processing apparatus identification information of said information processing apparatus which changes status and the information processing apparatus identification information of all the other information processing apparatuses.

6. A method of operating an information processing apparatus which is coupled to a plurality of other information processing apparatuses through a network, the method comprising:

(a) collecting information regarding resources and operating statuses of the other information processing apparatuses;

(b) creating an apparatus information table by:

(i) for each of the other information processing apparatuses, transmitting one of a plurality of first software cells to said other information processing apparatus, said transmitted first software cell including a direct memory access command, each of said other information processing apparatuses being configured to execute said transmitted direct memory access command, the apparatus information table including:

(A) apparatus data associated with the other information processing apparatuses when the information processing apparatus is in a master status; and (B) identifications associated with the other information processing apparatuses and the master/slave statuses associated with the other information processing apparatuses on the network when the information processing apparatus is in a slave status, the first software cells requesting transmissions of information regarding the other information processing apparatuses; and (ii) for each of the other information processing apparatuses, receiving one of a plurality of second software cells as a reply from said other information processing apparatus, said received second software cell including a status return command;

(c) exchanging information regarding capability with the other information processing apparatuses by transmitting one of the first software cells which includes information regarding own apparatus as the reply to the other information processing apparatus if the information processing apparatus receives one of the second software cells which requests the transmission of information regarding the information processing apparatus from the other information processing apparatus;

(d) upon connection to the network of an additional information processing apparatus which was not previously connected to the network, collecting classification identification information of said information processing apparatus, said classification identification information indicating at least one of a feature and a function of said information processing apparatus, wherein the apparatus data includes information processing apparatus identification information which is generated when powering on said information processing apparatus;

(e) comparing information regarding a resource required to execute a function program, with information regarding the resource and the operating status in the apparatus information table;

(f) specifying one of the information processing apparatuses capable of executing the function program if the function program retained in the information processing apparatus is executed; and (g) transmitting one of the first software cells which requests an execution of the function program to the information processing apparatus specified.

7. The information processing method according to claim 6, further comprising, upon connection to the network of the additional information processing apparatus which was not previously connected to the network, collecting information regarding a resource and an operating status of the additional information processing apparatus and updating the apparatus information table.

8. The information processing method according to claim 6, further comprising collecting information regarding a resource and an operating status of each of the plurality of processors, and saving the information in the apparatus information table, wherein the other information processing apparatus has a plurality of processors for processing the function program.

9. The information processing method according to claim 6, wherein information processing apparatus identification information of the information processing apparatus is generated by the information processing apparatus based at least in part on one or more of: (i) a date; and (ii) a time, of powering on of the information processing apparatus.

10. The information processing method according to claim 6, further comprising determining, upon disconnection from the network of an information processing apparatus in a master status, at least one of the other information processing apparatuses in a slave status to change to a master status based, at least in part, on a comparison of the information processing apparatus identification information of said information processing apparatus which changes status and the information processing apparatus identification information of all the other information processing apparatuses; and changing the determined information processing apparatus status to master status.

11. An information processing system in which one information processing apparatus and another information processing apparatus are coupled through a network, the one information processing apparatus comprising:
- a processor; and
- a memory device storing instructions which when executed by the processor, causes the processor to:
- (a) collect information regarding resources and operating statuses of the other information processing apparatuses;
- (b) create an apparatus information table by:
  - (i) for each of the other information processing apparatuses, transmitting one of a plurality of first software cells to said other information processing apparatus, said transmitted first software cell including a direct memory access command, each of said other information processing apparatuses being configured to execute said transmitted direct memory access command, the apparatus information table including:
    - (A) apparatus data associated with the other information processing apparatuses when the one information processing apparatus is in a master status; and
    - (B) identifications associated with the other information processing apparatuses and the master/slave statuses associated with the other information processing apparatuses on the network when the one information processing apparatus is in a slave status, the first software cells requesting transmissions of information regarding the other information processing apparatuses; and
  - (ii) for each of the other information processing apparatuses, receiving one of a plurality of second software cells as a reply from said other information processing apparatus, said received second software cell including a status return command;
- (c) exchange information regarding capability with the other information processing apparatuses by transmitting one of the first software cells which includes information regarding own apparatus as the reply to the other information processing apparatus if the information processing apparatus receives one of the second software cells which request the transmission of information regarding the information processing apparatus from the other information processing apparatus; and
- (d) upon connection to the network of an additional information processing apparatus which was not previously connected to the network, collect classification identification information of said information processing apparatus, said classification identification information indicating at least one of a feature and a function of said information processing apparatus, wherein the apparatus data includes information processing apparatus identification information which is generated when powering on said information processing apparatus;
- (e) compare information regarding a resource required to execute a function program, with information regarding the resource and the operating status in the apparatus information table; and
- (f) specify one of the information processing apparatuses capable of executing the function program if the function program retained in the information processing apparatus is executed; and
- (g) transmit one of the first software cells which requests an execution of the function program to the specified information processing apparatus.

12. The information processing system according to claim 11, wherein the instructions further cause the processor to:
upon connection to the network of the additional information processing apparatus which was not previously connected to the network, collect information regarding a resource and an operating status of the other information processing apparatus and update the apparatus information table.

13. The information processing system according to claim 11, wherein:
the other information processing apparatus has a plurality of processors for processing the function program; and
the instructions further cause the processor to collect information regarding a resource and an operating status of each of the plurality of processors in the other information processing apparatus, and save the information in the apparatus information table.

14. The information processing system according to claim 11, wherein information processing apparatus identification information of the information processing apparatus is generated by the information processing apparatus based at least in part on one or more of: (i) a date; and (ii) a time, of powering on of the information processing apparatus.

15. The information processing system according to claim 11, wherein, upon disconnection from the network of an information processing apparatus in a master status, at least one of the other information processing apparatuses in a slave status changes to a master status based, at least in part, on a comparison of the information processing apparatus identification information of said information processing apparatus which changes status and the information processing apparatus identification information of all the other information processing apparatuses.

* * * * *